United States Patent
Lee et al.

(10) Patent No.: US 11,183,184 B2
(45) Date of Patent: Nov. 23, 2021

(54) METHOD OF CONFIGURING LAUNDRY COURSE BASED ON SPEECH RECOGNITION USING ARTIFICIAL INTELLIGENCE AND DEVICE OF IMPLEMENTING THEREOF

(71) Applicant: LG ELECTRONICS INC., Seoul (KR)

(72) Inventors: Heungkyu Lee, Seoul (KR); Junhee An, Seoul (KR); Jin Ho Jeon, Seoul (KR); Jae Yong Won, Seoul (KR)

(73) Assignee: LG Electronics Inc., Seoul (KR)

( * ) Notice: Subject to any disclaimer, the term of this patent is extended or adjusted under 35 U.S.C. 154(b) by 122 days.

(21) Appl. No.: 16/230,572

(22) Filed: Dec. 21, 2018

(65) Prior Publication Data
US 2019/0198021 A1    Jun. 27, 2019

(30) Foreign Application Priority Data

Dec. 22, 2017    (KR) .................. 10-2017-0178486

(51) Int. Cl.
*G10L 15/22*    (2006.01)
*G10L 15/08*    (2006.01)
(Continued)

(52) U.S. Cl.
CPC ............ *G10L 15/22* (2013.01); *G06F 3/167* (2013.01); *G10L 15/08* (2013.01); *G10L 15/30* (2013.01);
(Continued)

(58) Field of Classification Search
CPC .............. G10L 15/30; G10L 2015/088; G10L 2015/223; G10L 15/22; G10L 15/08; G06F 3/167
(Continued)

(56) References Cited

U.S. PATENT DOCUMENTS

2006/0136221 A1    6/2006  James et al.
2011/0060587 A1*   3/2011  Phillips ................... G10L 15/30
                                                       704/235
(Continued)

FOREIGN PATENT DOCUMENTS

CN    101649537    2/2010
CN    103276554    9/2013
(Continued)

OTHER PUBLICATIONS

Extended European Search Report in European Application No. 18211888.5, dated May 6, 2019, 7 pages.
(Continued)

*Primary Examiner* — Michael Colucci
(74) *Attorney, Agent, or Firm* — Fish & Richardson P.C.

(57) ABSTRACT

A method of configuring a laundry course based on speech recognition using artificial intelligence and a device for implementing the same. A washing machine of configuring the laundry course based on the speech recognition includes a speech input unit that receives a speech included with a StainWord or a ClothWord to produce speech data, a communication unit that transmits identification information of speech data and a washing machine to a server and receive course configuring information corresponding to the Stain-Word or the ClothWord from the server, and a speech guidance unit that outputs a speech guide message that guides a laundry course corresponding to course configuring information, and a control unit that controls a speech input unit, a communication unit, and a speech guidance unit.

20 Claims, 19 Drawing Sheets

(51) Int. Cl.
*G10L 15/30* (2013.01)
*G06F 3/16* (2006.01)

(52) U.S. Cl.
CPC .. *G10L 2015/088* (2013.01); *G10L 2015/223* (2013.01)

(58) Field of Classification Search
USPC ........................................................ 704/235
See application file for complete search history.

(56) References Cited

U.S. PATENT DOCUMENTS

| | | | | |
|---|---|---|---|---|
| 2014/0156082 A1* | 6/2014 | Ha | ...................... | H04L 12/2818 700/275 |
| 2014/0197934 A1* | 7/2014 | Ha | ...................... | H04L 12/12 340/12.5 |
| 2016/0215430 A1* | 7/2016 | Ha | ...................... | H04L 12/282 |
| 2016/0218884 A1* | 7/2016 | Ebrom | ...................... | H04L 67/12 |
| 2016/0258104 A1 | 9/2016 | James | | |
| 2018/0122366 A1* | 5/2018 | Nishikawa | ...................... | G10L 15/26 |
| 2018/0133583 A1* | 5/2018 | Tran | ...................... | A63B 24/0075 |
| 2018/0233806 A1* | 8/2018 | Yikilmazcinar | ...................... | H01Q 19/30 |
| 2018/0305856 A1* | 10/2018 | Welch | ...................... | G06Q 20/18 |
| 2019/0136440 A1* | 5/2019 | Clarke | ...................... | C11D 3/39 |
| 2019/0153653 A1* | 5/2019 | Clayton | ...................... | D06F 34/32 |
| 2019/0292710 A1* | 9/2019 | Cooke | ...................... | C11D 11/0017 |
| 2020/0043274 A1* | 2/2020 | Hone | ...................... | G07F 15/04 |

FOREIGN PATENT DOCUMENTS

| | | |
|---|---|---|
| CN | 105637139 | 6/2016 |
| CN | 106245270 | 12/2016 |
| CN | 107227582 | 10/2017 |
| JP | 2002355486 | 12/2002 |
| KR | 10-2012-0023497 A | 3/2012 |
| KR | 20120023497 | 3/2012 |
| KR | 10-2016-0068938 A | 6/2016 |
| KR | 20190023911 | 3/2019 |
| WO | WO2017162188 | 9/2017 |

OTHER PUBLICATIONS

Chinese Office Action in Chinese Appln. No. 201811523440.X, dated Sep. 27, 2020, 20 pages (with English translation).

* cited by examiner

FIG. 13
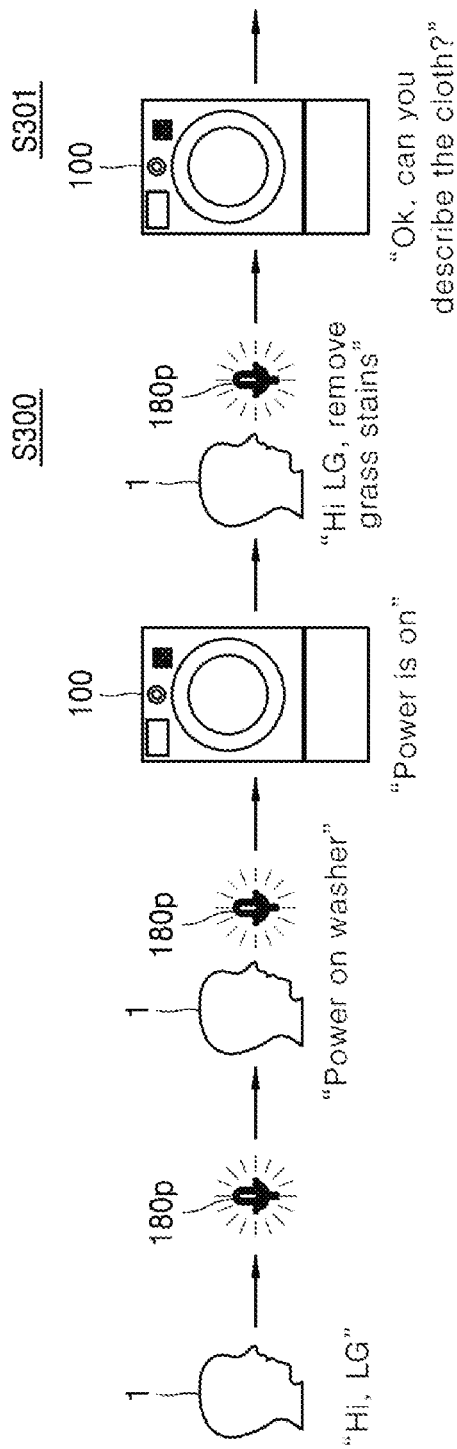
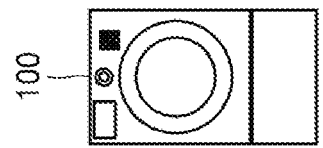

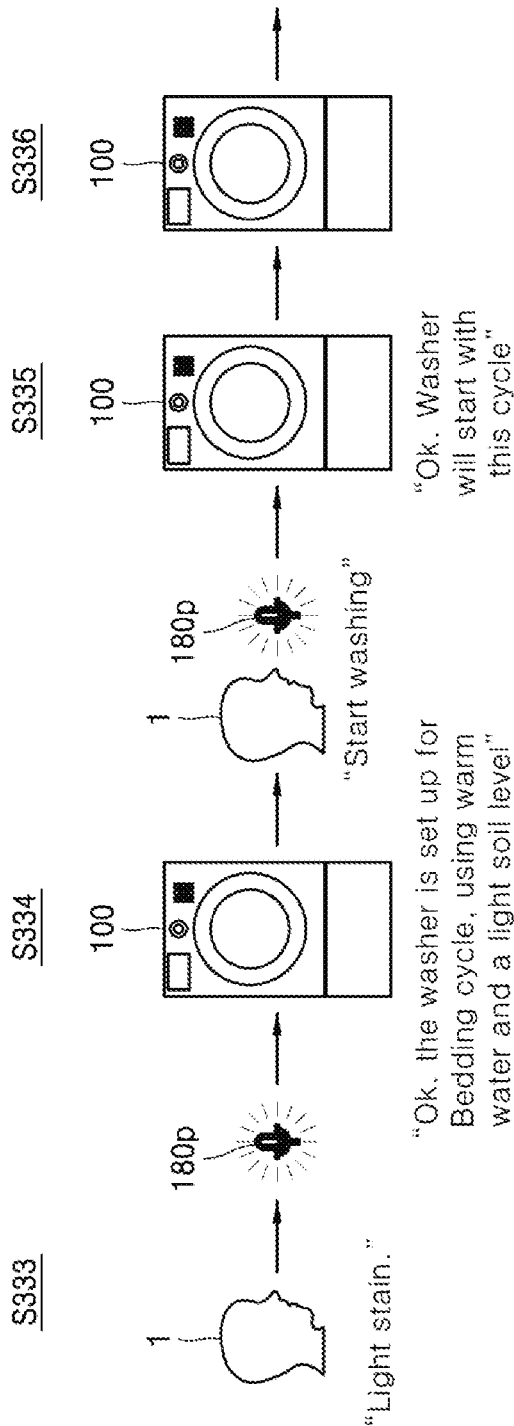

METHOD OF CONFIGURING LAUNDRY COURSE BASED ON SPEECH RECOGNITION USING ARTIFICIAL INTELLIGENCE AND DEVICE OF IMPLEMENTING THEREOF

CROSS-REFERENCE TO RELATED APPLICATION

This application claims priority to and the benefit of Korean Patent Application No. 10-2017-0178486, filed on Dec. 22, 2017, the disclosure of which is incorporated herein by reference in its entirety.

TECHNICAL FIELD

This application relates to a method of configuring a laundry course based on speech recognition and a device of implementing the same.

BACKGROUND

In recent years, technology that controls home appliances and home electric appliances, etc., based on a speech is variously being proposed. Particularly, in controlling the devices such as home appliances and home electric appliances, etc., a study is being continued to enable an operation of equipment without a separate touch-based configuring operation by user.

On the other hand, in a case of washing machine, it is not easy to accurately determine a state of laundry required for washing. In spite of that, washing machine is expected to provide a laundry course adequate for a current state of laundry.

Accordingly, a method of obtaining information on the laundry, which is useful for washing the laundry in a laundry course most suitable for a current state of the laundry, based on speech recognition, and a device of implementing such method are required. The present specification describes these method and device.

SUMMARY

In some implementations, the present invention as defined in the appended independent claims resolves the above-mentioned problem and provides a method and a device that interactively control a detailed function for controlling a washing machine.

These method and/or device enable controlling an operation of a washing machine by interactively inputting a word necessary for washing into a washing machine.

The objects of this application are not limited to the above-mentioned objects, and the other objects and advantages of this application, which are not mentioned, can be understood by the following description, and more clearly understood by the embodiments in this application. It will be also readily understood that the objects and the advantages of this invention may be realized by means or method defined in the claims.

In an exemplary implementation of the invention, there is provided a washing machine of configuring a laundry course based on a speech recognition. The washing machine includes a speech input unit that receives a speech including any one or more of a Stain Word and a Cloth Word obtained from a user to convert the received speech into a speech data, wherein the Stain Word is a word indicating a name of stain, a color of stain, or a chemical property of stain, and the Cloth Word is a word indicating a kind of laundry, a fabric name of laundry, or a color of laundry; a communication unit that transmits identification information of the washing machine and the speech data to a first server, and receives course configuring information corresponding to any one or more of the Stain Word and the Cloth Word from any one of the first server or a second server that is distinguished with the first server; a speech guidance unit that outputs a speech guide message that notifies a laundry course corresponding to the course configuring information; and a control unit that controls the speech input unit, the communication unit, and the speech guidance unit.

In another exemplary implementation of the invention, there is provided a system of configuring a laundry course based on a speech recognition. The system includes the washing machine defined above, and a central control server. The central control server includes an equipment control unit that searches course configuring information applicable to the washing machine in a database by using a first keyword corresponding to the Stain Word, a second keyword corresponding to the Cloth Word, and identification information of the washing machine; and a communication unit that transmits the searched course configuring information to the washing machine.

In another exemplary implementation of the invention, there is provided a washing machine which includes a speech input unit configured to receive a speech including any one or more out of a Stain Word and a Cloth Word from a user to convert the received speech into a speech data, wherein the Stain Word is a word indicating a name of stain, a color of stain, or a chemical property of stain, and the Cloth Word is a word indicating a kind of laundry, a fabric name of laundry, or a color of laundry; a speech recognition unit configured to perform speech recognition on the speech data to covert the speech data into text data; a control unit configured to extract at least one keyword corresponding to the one or more out of the Stain Word and the Cloth Word from the text data, and determine course configuring information based on the at least one extracted keyword; and a speech guidance unit configured to output a speech guide message that notifies a laundry course corresponding to the course configuring information.

In another exemplary implementation of the invention, there is provided a method for configuring a laundry course based on a speech recognition. The method includes receiving, by a washing machine, a speech including any one or more of a Stain Word and a Cloth Word from a user, wherein the Stain Word is a word indicating a name of stain, a color of stain, or a chemical property of stain, and the Cloth Word is a word indicating a kind of laundry, a fabric name of laundry, or a color of laundry; converting the received speech into a speech data; transmitting the speech data and identification information of the washing machine to a first server; receiving course configuring information corresponding to the Stain Word and the Cloth Word from any one of the first server or a second server that is distinguished with the first server; and outputting a speech guide message that notifies a laundry course corresponding to the course configuring information.

When this invention is applied, it is possible to interactively control the detailed function for controlling the washing machine.

Further, when this invention is applied, a laundry course or an option item for the laundry course is automatically recommended based on results of the speech recognition function of the washing machine without selecting the laundry course or the option by user him/herself. Thus, a laundry course or an option item for the laundry course, which is the most adequate for a state of laundry, can be selected, and thereby washing performance of the washing machine can be enhanced.

The effect of this invention is not limited to the above-mentioned effect, and those skilled in the art of this application can easily understand various effects of this invention based on the disclosure of this application.

BRIEF DESCRIPTION OF THE DRAWINGS

FIGS. 13 and 14 shows a process in which speech recognition is performed in a washing machine according to the invention;

FIGS. 18 and 19 show a process in which a speech recognition s performed in a washing machine according to the invention.

DETAILED DESCRIPTION

Figure 1:
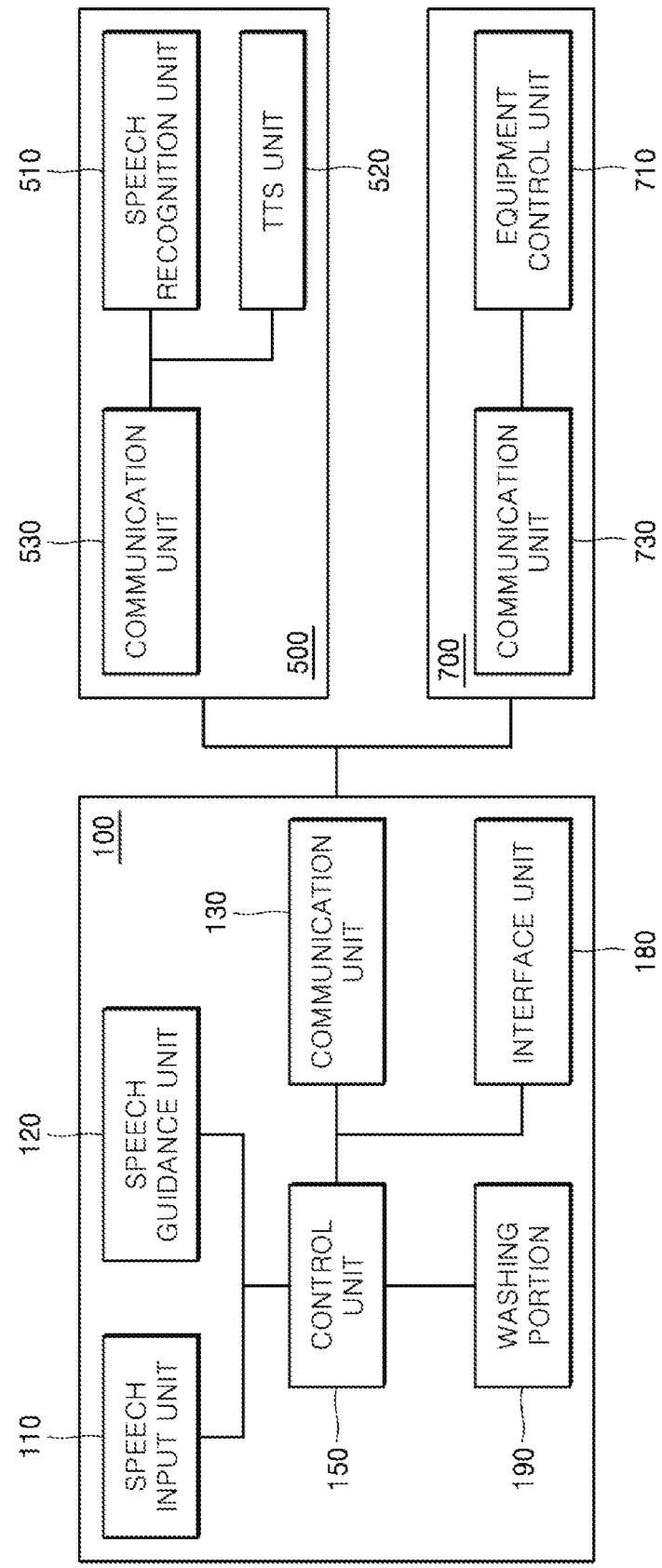
FIG. 1 shows a configuration of a washing machine according to an exemplary implementation of this invention.

Hereinafter, the embodiments of this invention will be described in detail with reference to the drawings so that those skilled in the art to which this invention pertains can easily carry out this invention. This invention may be implemented in various different manners and is not limited to the embodiments described herein.

In order to clearly illustrate this invention, a part that is not related to the description is omitted, and the same or similar component is denoted by the same reference numeral throughout the specification. Further, some embodiments in this application will be described in detail with reference to exemplary drawings. In adding the reference numeral to the components of each drawing, the same components may have the same sign as possible even if they are displayed on different drawings. Further, in describing this invention, a detailed description of the related known configuration and function will be omitted when it is determined that it may obscure the gist of this application.

In describing the invention, it is possible to use the terms such as first, second, A, B, (a), (b), etc. These terms are only intended to distinguish the component from another component, and a nature, an order, a sequence, or the number of the corresponding components are not limited by that term. When a component is described as being "connected", "coupled", or "connected" to another component, the component thereof may be directly connected or connected to the another component thereof; however, it is to be understood that another component may be "interposed" between each component, or each component may be "connected", "coupled" or "connected" through another component. Further, in implementing the invention, although it may be described by subdividing the component for convenience of explanation, the components may be implemented in a device or a module, or a component may be implemented by being divided into a plurality of devices or modules.

In the present specification, the devices that perform a function necessary for washing, or drying, or dry cleaning cloth, blanket, a doll, etc., are collectively referred to as a washing machine (i.e., washer). That is, in the present specification, the objects including cloth, such as clothes, blanket, the doll is collectively referred to as laundry. Further, in the present specification, all devices that provide various functions to clean or dry the laundry, or remove dust, or perform dry cleaning are collectively referred to as a washing machine, and the device is not limited to narrow washing performance.

In the present specification, a user may input information of the laundry interactively with the washing machine in a process of inputting or arranging the laundry into the washing machine, and the washing machine may extract meaningful information from inputted information to select a laundry course suitable for the laundry.

FIG. 1 shows a configuration of a washing machine in accordance with an exemplary implementation of this invention. FIG. 1 shows a structure in which a washing machine performs speech recognition and a course selection by using a speech server disposed separately from the washing machine.

A washing machine 100 may include a speech input unit 110, a speech guidance unit 120, a communication unit 130 a control unit 150, an interface unit 180 and a washing portion 190.

Speech data that the washing machine 100 receives may be transmitted to a speech server 500, and the speech server 500 may analyze the speech data as to which speech is inputted. In a central control server 700, an equipment control unit 710 may generate a control instruction that controls the washing machine 100 based on analyzed speech data and it may transmit it to the washing machine 100 through a communication unit 730 so that the washing machine 100 controls it. The interface unit 180 may provide a function to output predetermined information and receive a touch input or a button input capable of an operation such as a menu selection from a user.

Functions of more detailed components will be described.

The speech input unit 110 may receive a speech included with any one or more of a word ("Stain Word") that indicates a kind of stain, or a word ("Cloth Word") that indicates a kind of laundry (or fabric) from the user, and generate it as speech data.

The Stain Word may include any one of a name of the stain or a color of the stain or a chemical property of the stain. For example, the following words present a Name of Stain, which is set of various contaminants' name. The Name of Stain may include, such as, Curry, Pepper, Ketchup, Coffee, Tea, Fruit, wine, Make-up, Fat, Oil, Lip stick, Shoe Polish, Grease, Cocoa, Tomato sauce, Spinach, Blood, Grass. Although it is provided in English here, it may be provided in various languages.

Name of Stain={"Curry", "Pepper", "Ketchup", "Coffee", "Tea", "Fruit stain", "Red wine", "Make-up", "Fat/Oil", "Lip stick", "Shoe polish", "Grease" "Cocoa", "Tomato beef sauce", "Spinach", "Blood", "Grass"}

In addition to that, the Stain Word may also indicate the color of the stain. Various names for a color, such as black, red, etc., are an embodiment of the Stain Word that describes the stain. Further, the chemical property of the stain that is important in washing can also be an example of the Stain Word. It may be an oil component, or an aqueous, solid, liquid, etc. Dust, powder, adhesive, etc., can also be an example of the Stain Word that represents the chemical property of the stain.

In addition, a level of contamination or temporal property information of the contaminant may be included in the Stain Word. For example, in a case of a contamination that is difficult to be erased, the user can utter a contamination level as "Heavy". Further, the user can utter as "Last week" as the temporal property information when a week has passed after contamination. All of this information is an embodiment of the Stain Word.

On the other hand, the Cloth Word may include any one of the kind of the laundry, the fabric name of the laundry, or the color of the laundry. The kinds of laundry may be skirt, blouse, pants, underwear, outdoor, sportswear, towel, baby clothes, blanket, and a doll, etc. The fabric name may be cotton, wool, silk, polyester, nylon, gore-tex, duck down, etc. The color of the laundry may include color information of the laundry like the stain.

Hereinafter, in the present specification, the Stain Word and the Cloth Word are based on the above-described embodiments, but it is not limited thereto, and any word that can identify the contamination of the laundry in washing may be an embodiment of the Stain Word. Likewise, any word that can identify the kind of laundry in the washing may be an embodiment of a Cloth Word.

The exemplary embodiment of the speech input unit 110 may be a kind of a microphone. One or more of microphones may be an example of the speech input unit 110 in order to receive only the speech of the user. The speech input unit 110 may include one or more microphones, and a module that removes noise may be additionally included. In this case, the speech input unit 110 may extract only the speech, and convert it into speech data, and transmits it to a speech server 500 through a communication unit 130.

The communication unit 130 may transmit the speech data generated from the speech inputted into the speech input unit 110 and the identification information of the washing machine 100 to a first server, and receive course configuring information corresponding to any one or more of the Stain Word or the Cloth Word from any one of the first server or a second server that is distinguished with the first server.

The washing portion 190 may include the components that provide a washing function. It is possible to provide a function, such as water supply, drainage, washing, rinsing, etc.

Here, when a server with which the washing machine 100 communicates is the central control sever 700 and the speech server 500 as in FIG. 1, the first server may be the speech server 500 and the second server may be the central control server 700. In this case, the communication unit 130 may receive course configuring information from the central control server 700 and the speech recognition may be communicated separately with the speech server 500.

Further, when it is a server that the speech server 500 and the central control server 700 are integrated into one, the communication unit 130 can perform a communication with an integrated server. Having the plurality of servers or a server, and separating the server by function, or integrating them into a server may correspond to various embodiments, and this application is not limited to any one thereof.

On the other hand, a speech recognition unit 510 of the speech server 500 may recognize the speech data transmitted from a washing machine 100. In this process, the speech server 500 may perform automatic speech recognition (ASR) and a natural language processing (NRP) on the speech data to extract a meaningful word. An extracted word may be transmitted to a central control server 700 and the central control server 700 may grasp a control intention of a user to remotely control the washing machine 100.

The equipment control unit 710 may generate a control instruction suitable for a control intention of a user, that is, course configuring information necessary for a washing, and transmit it to a washing machine 100 through a communication unit 730. In this process, the washing machine 100 may directly output it to a speech guidance unit 120 for an implementation of the received instruction, i.e., to wash laundry in a specific laundry course. Alternatively, when speech data to be outputted in a Text to Speech (TTS) unit of a speech server 500 is produced and it is also provided to the washing machine 100 through a communication unit 530, the washing machine 100 may output received speech data to guide a laundry course to a user.

In summary, when the laundry course is configured according to the speech which is obtained or inputted by the speech input unit 110, the speech guidance unit 120 can output a speech guide message that guides a laundry course corresponding to course configuring information.

Here, the course configuring information may include a combination of any one or more of a washing strength of the washing machine (Spin), a temperature of water (Temperature), a kind of detergent, an amount of detergent, or a contaminant removal strength of the laundry (Soil Level). The course configuring information may be displayed on an interface unit 130 and the user may select it.

The control unit 150 can control these components. In particular, it is possible to control the washing machine 100 so that the washing machine 100 operates based on the course configuring information that the communication unit 130 receives.

When a configuration of the washing machine 100 of FIG. 1 is applied, it is possible to configure an optimum laundry course through an interactive speech recognition. For example, even if the user does not know well about a laundry course configuring and an option supported in the washing machine 100, when the washing machine is informed interactively about the kinds of a contaminant such as lawn (Grass water), Coffee, Ketchup, etc., or a kind of cloth, it is possible to configure and recommend the optimum laundry course and any options related to a laundry course.

That is, it is possible to collect the information to configure the laundry course by the interactive speech recognition method, and to automatically configure it with an optimum laundry course provided in the washing machine by a laundry course conversion process, and recommend it to the user through a speech synthesizer. The components 500 and 700 in FIG. 1 can be implemented separately from the washing machine 100, and on the contrary, these can be integrated within the washing machine 100. Alternatively, any one or more of the components that are included in the speech server 500 and the central control server 700 may be included in the washing machine 100.

Figure 2:
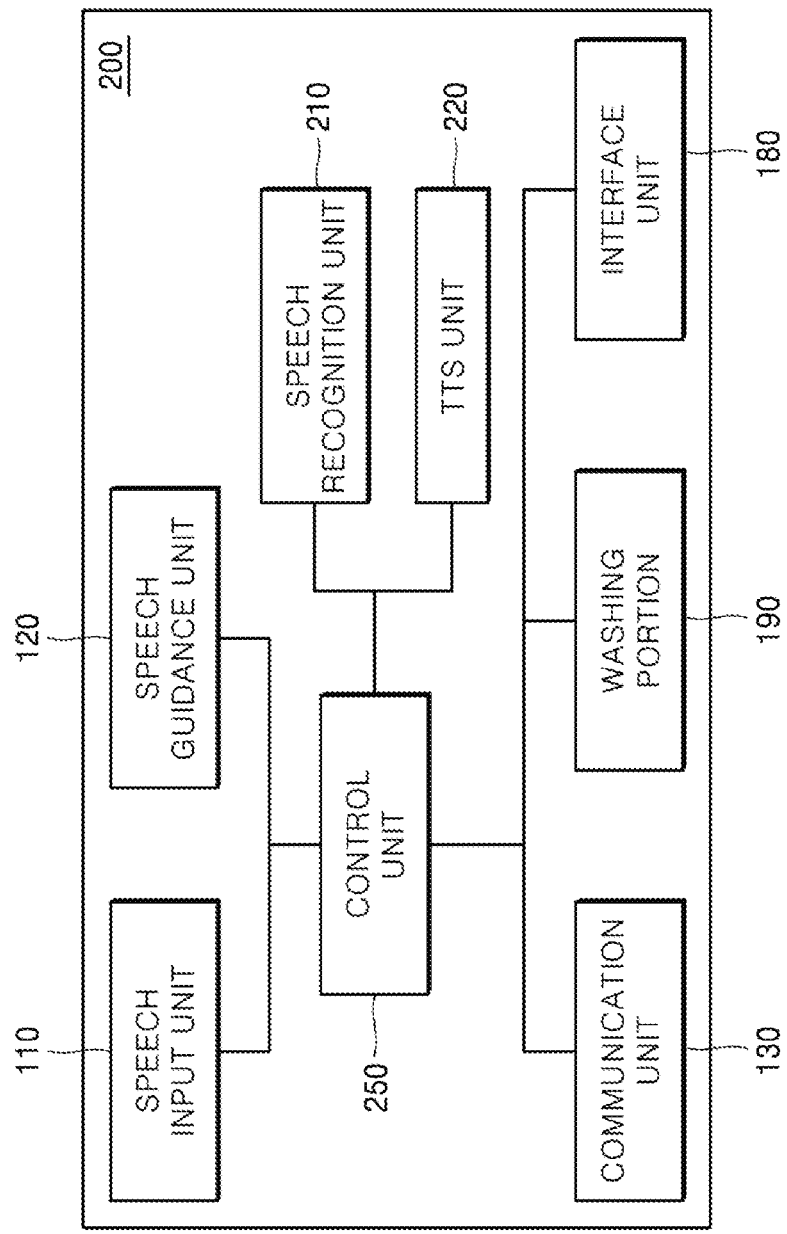
FIG. 2 shows a configuration in which all components required for the invention are integrated within a washing machine according to another implementation of this invention.

FIG. 2 shows a configuration in which all components are integrated in a washing machine according to another implementation of this invention.

In FIG. 2, a speech recognition unit 210 in a washing machine 200 may provide a function of the speech recognition unit 510 of the speech server 500 described in FIG. 1. A TTS unit 220 in the washing machine 200 in FIG. 2, may provide a function of the TTS unit 520 of the speech server 500 described in FIG. 1. Further, a control unit 250 of the washing machine 200 may include the function of the equipment control unit 710 of the central control server 700 of FIG. 1 in the above and provide the function. Therefore, with regard to a function that each of the component provides, the description of FIG. 1 will be referred.

FIGS. 1 and 2 can be classified depending on whether the speech recognition, the TTS function, and the function related to an equipment control are included in an external server or in a washing machine. In a different way with FIGS. 1 and 2, only a part of the function also may be included in the washing machine, and only a part of the function may be included in the server, and this application may include such various embodiments thereof.

Figure 3:
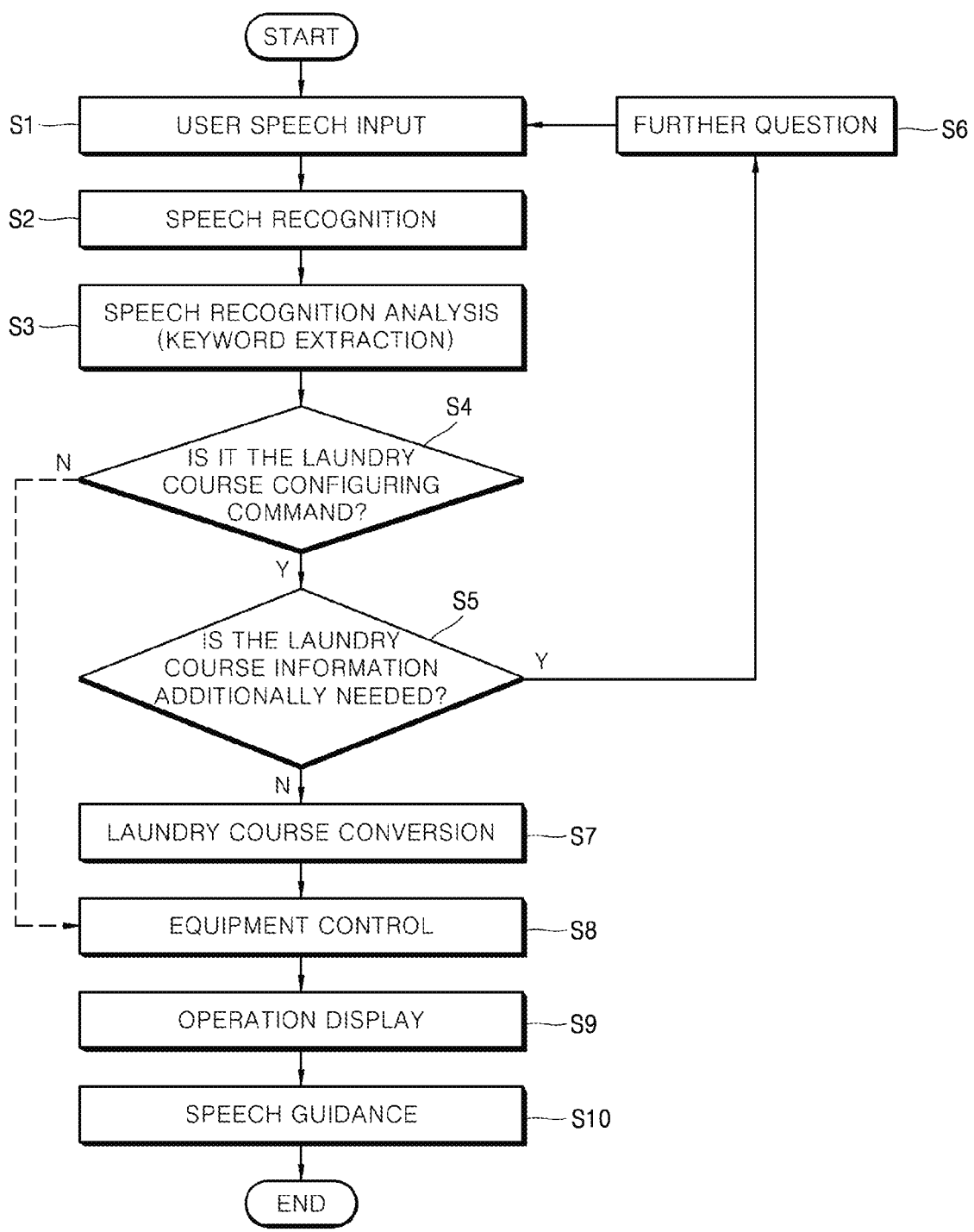
FIG. 3 shows an operation process of a washing machine according to the invention.

FIG. 3 shows an operation process of a washing machine according to the invention. The user may input a speech around the washing machines 100 and 200 (S1). An inputted speech may be converted into speech data, which performs a speech recognition process again. When it is based on FIG. 1, the speech received or obtained by the speech input unit 110 of the washing machine 100 may be converted into the speech data. And the converted speech data can be transmitted to the speech server 500 by the communication unit 130 of the washing machine 100, and the speech recognition unit 510 of the speech data 500 may analyze the speech data to perform the speech recognition (S2).

When it is based on FIG. 2, the speech input unit 110 of the washing machine 200 may convert the received speech input into the speech data and the speech recognition unit 510 of the washing machine 200 may analyze the speech data to perform the speech recognition (S2).

During the step S2, a text is generated, which is a result of speech recognition. When the text is generated, with regard to this text, the equipment control unit 710 of the central control server 700 or the control unit 250 of the washing machine 200 may analyze an intention of a user based on the text. The equipment control unit 710 of the central control server 700 or the control unit 250 of the washing machine 200 may extract a keyword suitable for an operation of the washing machines 100 and 200 by analyzing the result based on the speech recognition (S3).

The equipment control unit 710 of the central control server 700 or the control unit 250 of the washing machine 200 may determine whether there is a word representing a laundry course configuring command previously when the keyword is extracted (S4). If there is a word representing a simple equipment control such as On/Off other than the laundry course configuration, the control flow may proceed to S8 and the washing machine may be operated in response to a corresponding equipment control.

On the other hand, if there is a word representing a laundry course configuring command after said determination, the equipment control unit 710 or the control unit 250 may determine whether there is more information required for configuring the laundry course, that is, whether laundry course information is further needed based on the above (S5). If additionally required, it may control the speech guidance unit 120 to ask an additional question (86) to user, and accordingly, it is possible to repeat the steps of S1 to S5.

If the information required for configuring a laundry course is sufficiently provided (85), the equipment control unit 710 or the control unit 250 may convert or adjust the laundry course (87), and control the equipment, i.e., the washing machine, based on the converted or adjusted laundry course (S8). Then, the washing machines 100 and 200 may display a description of the course to be operated through the interface unit 180 (S9), and perform the speech guidance on the course by the speech guidance unit 120 (S10).

An operation process of FIG. 3 will be described as follows.

When the speech that the user utters includes a word representing a laundry course configuring command based on the text result generated by the speech recognition server 500 or the speech recognition unit 210, and the control unit 250 or the washing machine 200 or the central control server 700 may analyze it to determine a desired the laundry course configuration, it may continuously inquire an additional question to configure an optimum laundry course interactively to obtain desired information, and when further information is not required any more, it may configure the optimum laundry course by a laundry course conversion module and recommend it to user.

As in a flow of S4, S8, S9, and S10 in FIG. 3, in the case of the simple equipment control such as On/Off, it is possible to control the equipment, and display a controlled result on a screen, and provide a feedback through a speech guidance announcement.

In FIG. 3, S4 may be optionally included. Further, S5 may also be made to receive additional information by the repeatedly predetermined number. Therefore, steps S4 and S5 may be optionally included.

Figure 4:
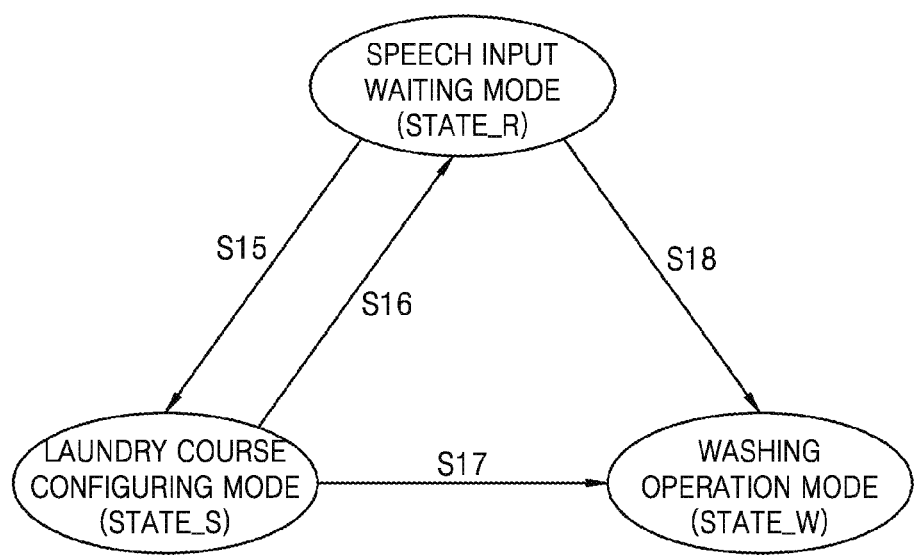
FIG. 4 shows a state in which a washing machine may have according to the invention.

FIG. 4 shows modes in which a washing machine may operate according to the invention. The washing machines 100 and 200 suggested in FIG. 1 or 2 may maintain a mode (STATE_R) in which the washing machine waits for a speech input together with a power-on. When the speech is inputted in a maintaining state, it may maintain a mode in which the washing machine configures the laundry course (STATE_S) in response to the speech input (S15). In this process, when the information is sufficiently provided, it may change the state of washing machine to a washing operation mode (STATE_W)(S17). However, when the information is not sufficiently provided, it may change the state from the configuring mode (STATE_S) to a speech input waiting mode (STATE_R) (S16).

Alternatively, a user can control an interface unit 180 without a separate speech input in the speech input waiting portion (STATE_R) to control an operation of a washing machine (S18).

Based on the above-mentioned operation and state of the washing machine, in a situation in which it is difficult for a user to easily decide a laundry course suitable for current laundry (in a case in which it is difficult for a user to determine as to which method of washing is required, and which course has to be selected, and which option has to be selected, etc.), only if the user inputs a characteristic of the laundry, for example, the kind of the contaminant (lawn, Coffee, Ketchup, etc.) and the kind of cloth (Sports wear, Baby clothes, underwear, etc.) to the washing machines 100 and 200 by speech interactively, the washing machine itself may select an optimum laundry course for current laundry from the inputted speech data, and display the recommended laundry course, and guide the washing for it.

As described in FIGS. 3 and 4, by using a speech recognition function of the washing machine or a server connected to the washing machine, while the user interacts with the washing machine mainly or only orally, it is possible to obtain the information to configure the optimum laundry course, for example, the kind of the washing contaminant and the kind of cloth to be washed, etc.

For this purpose, the user may utter the kind of the contaminant, and in response to that, the washing machine may perform a speech guidance that requests information on the kind of cloth. In response to this, when the user utters the kind of cloth by speech, the washing machine can perform the speech guidance to request information on the contamination degree of the contaminant. When the user says a degree of the contaminant as heavy/normal/light, the washing machine may find an optimum recommended laundry course based on the information on the inputted contaminant, the kind of cloth to be washed, the degree of contamination, or an additionally contaminated time point, etc., and provide a guide speech with regard to it to the user through the speech guidance unit to provide the optimal laundry course that meets the intention of the user.

Figure 5:
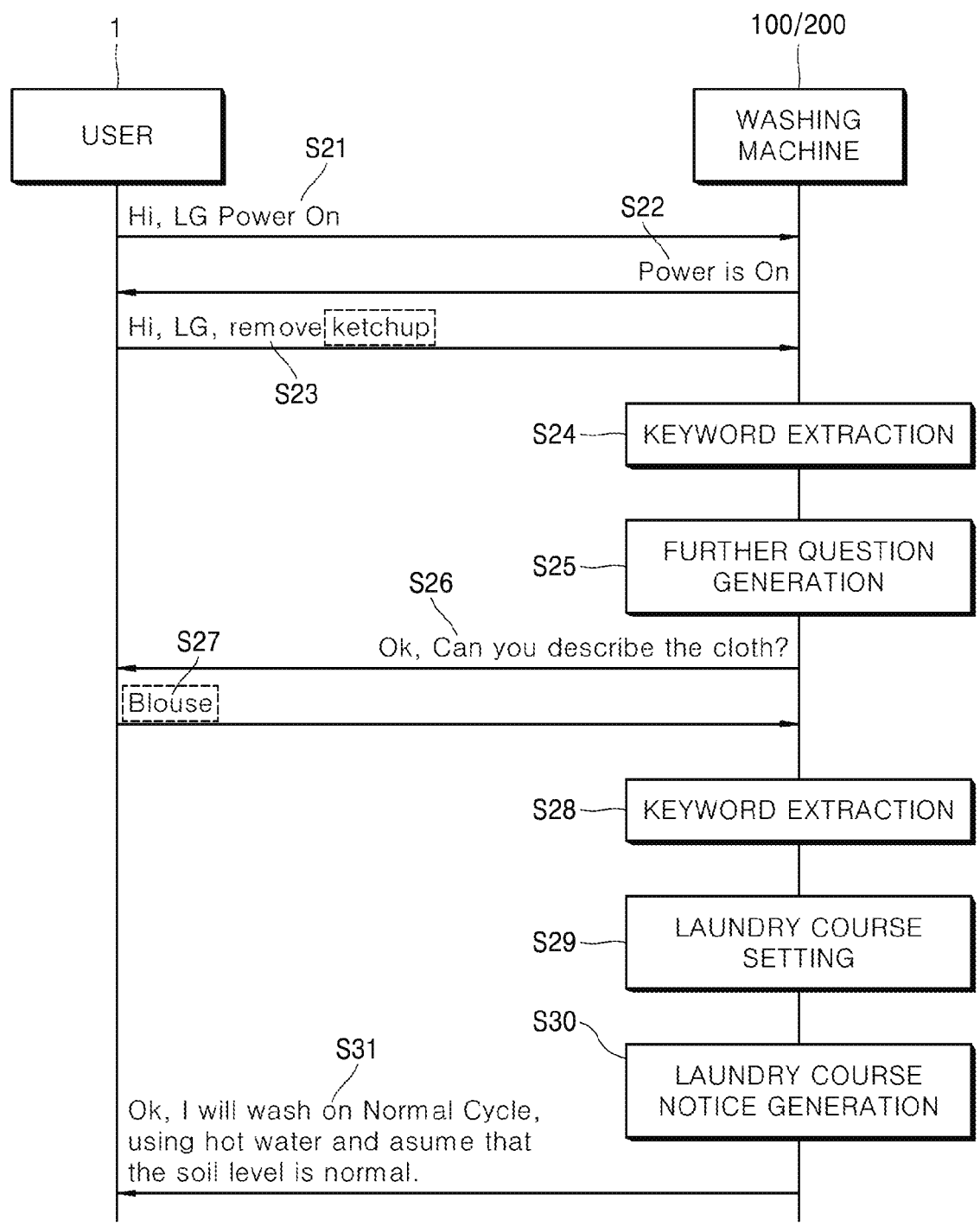
FIG. 5 shows a performing example of a speech recognition according to the invention.

FIG. 5 shows an example of speech recognition performed according to the invention. According to FIG. 5, while a power of a washing machine is on, when a user inputs a Stain Word related to current laundry, such as Ketchup, lawn, Coffee, etc., to the washing machines 100 and 200 by speech, the washing machine 100 and 200 instructs the user to say a kind of cloth. In response to this, when the user says a kind of cloth (blouse, sportswear, shirt) of the current laundry, it is possible to configure an optimum laundry course and further options suitable for the provided information and guide it. It will be described in more detail.

Even though the washing machines 100 and 200 may be able to perform speech recognition at least partially in cooperation with a speech recognition server 500 for inputted speech data and extract a keyword, FIG. 5 represents that the washing machine 100 itself performs the speech recognition for convenience of explanation. FIG. 5 shows that the washing machine 200 directly performs a keyword extraction after the speech recognition, but the washing machine 100 may be able to indirectly perform it by using a result produced through the speech recognition server 500 for the operations of the washing machines 100 and 200.

When a user 1 utters a speech of "Hi, LG Power On" to operate the washing machines 100 and 200 (S21), the washing machines 100 and 200 may recognize it and perform the speech guidance of outputting "Power is On" (S22). With regard to speech recognition of the washing machines 100 and 200, it may convert a speech that a speech input unit 110 receives into the speech data, and it may transmit it to the speech recognition server 500 or perform speech recognition in the speech recognition unit 210 in the washing machine 200. A speech guidance unit 120 may output a guidance speech in response to the recognized speech (S22).

The user 1 can utter an intention that the user wants to achieve through the washing machine by oneself in conversation in response to the guidance speech of the washing machines 100 and 200. For example, the user can say "Hi, LG, remove ketchup" (S23). A speech recognition unit 210 may perform speech recognition on the speech inputted by the user. The washing machine 200 or the speech recognition server 500 may include the speech recognition unit 210 to extract a keyword (S24).

The keyword may be a word that indicates a kind of stain such as "Ketchup" in S23. The keyword may be one of various stains which usually occur in the laundry, and are listed up and stored in a DB in advance. The speech recognition unit 210 may separate a sentence that the user utters by words to search whether there is a name that coincides with that of the stain stored in the DB, among them.

If the keyword for the stain is extracted (S24), it is possible to generate a further question about the laundry stained (S25). For example, the washing machines 100 and 200 can perform a speech guidance to inquire a material or a kind of laundry, such as "Ok, Can you describe the cloth?" (S26).

The user 1 may respond as "Blouse" in response to the speech guidance, and the speech recognition is performed by the speech recognition unit 210 in the washing machine 200 or the speech recognition server 500 to extract the keyword (S28). The extracted keyword may be "Blouse". this keyword may be used together with "Ketchup", extracted in S24 previously, so that the washing machine 200 or the central control server 700 may configure a laundry course (S29). It may produce a configuring laundry course notice (S30) and the washing machines 100 and 200 may output it (S31). As an exemplary implementation, a message of outputted sentence may be "Ok, I will wash on Normal Cycle, using hot water and assume that the soil level is normal." "Normal Cycle", "hot water", "soil level is normal" may be a configured value of the laundry course, which can be derived in two pieces of information on the laundry ("Ketchup" and "Blouse").

The configuration process as in FIG. 5 can be applied to various kinds of stains and laundry. Depending on a combination of such kinds of the stain and the laundry, the most appropriate laundry course for laundry can be configured.

An example configuring laundry courses according to kinds of stain and laundry based on the implementation of FIG. 5 is as in Table. 1

TABLE 1

| Stain (S23) | Laundry (S27) | Laundry course | Output notice (S31) |
|---|---|---|---|
| Grass stain | Sports wear | Heavy Duty Cycle Hot water Soil level is heavy | Ok, I will wash on Heavy Duty Cycle, using hot water and assume that the soil level is heavy. |
| Coffee stain | Dress Shirts | Perm. Press Cycle Hot water Soil level is normal | Ok, I will wash on Perm. Press Cycle, using hot water and assume that the soil level is normal. |

As in Table 1, it is possible to maintain a constant mapping relationship between the stain, the laundry, and the laundry course, and as a result, it is possible to select a mapped laundry course.

In the case of applying an implementation of FIG. 5, even if the user does not know well about which function is provided by the washing machine that the user wants to use, or which washing method is good, when the user say information with regard to the laundry, for example, the kind of the contaminant, the kind of the laundry, and the contamination degree, etc., through an interactive speech recognition method, the washing machine can recommend an optimum course by itself.

The sentences that the user uttered are converted into a text after the speech recognition and it may extract the keyword from these texts. Then, an equipment control unit 710 of a central control server 700 or the control unit 250 of the washing machine 200 may perform a mapping process based on the extracted keyword. The mapping process can configure the laundry course by using a keyword related to stain, a keyword related to laundry, or other keyword necessary for the course configuration.

FIG. 5 will be summarized as follows. In FIG. 5, when a Stain Word is uttered (S23), the washing machines 100 and 200 may output a guide message that requests an utterance of a Cloth Word (S26). On the contrary, if a Cloth Word is firstly uttered in FIG. 5, the washing machines 100 and 200 may output a guide message that requests an utterance of the Stain Word.

Accordingly, in one embodiment of this application, when it is determined that any one of the Stain Word or the Cloth Word is inputted or obtained in the inputted speech, or incorrectly inputted, or an additional confirmation is further required, a speech guide message that requests further information may be outputted in the washing machine.

In the configuration as in FIG. 1, the communication unit 130 may receive the message that instructs the output of the guide message to request the utterance of the Stain Word or the Cloth Word, from a speech server (a first server 500) or a central control server (a second server 700). After the speech guidance unit 120 outputs the received message, the user who confirmed it can utter a Stain Word or Cloth Word requested. As a result, the speech input unit 110 may receive the speech including the Stain Word or the Cloth Word, which are requested for the utterance, to generate the speech data, so that the communication unit 130 can transmit it to the speech server (the first server, 500), which is transmitted to the central control server 700 again.

The central control server 700 can search the course configuring information by using the previously inputted Cloth Word or Stain Word and the newly inputted Stain Word or Cloth Word.

When the process of FIG. 5 is implemented in a washing machine 200, the speech recognition unit 210, the TTS unit 220, the control unit 250, etc., which are the components in the washing machine 200, may perform an operation of each server described in the above.

Figure 6:
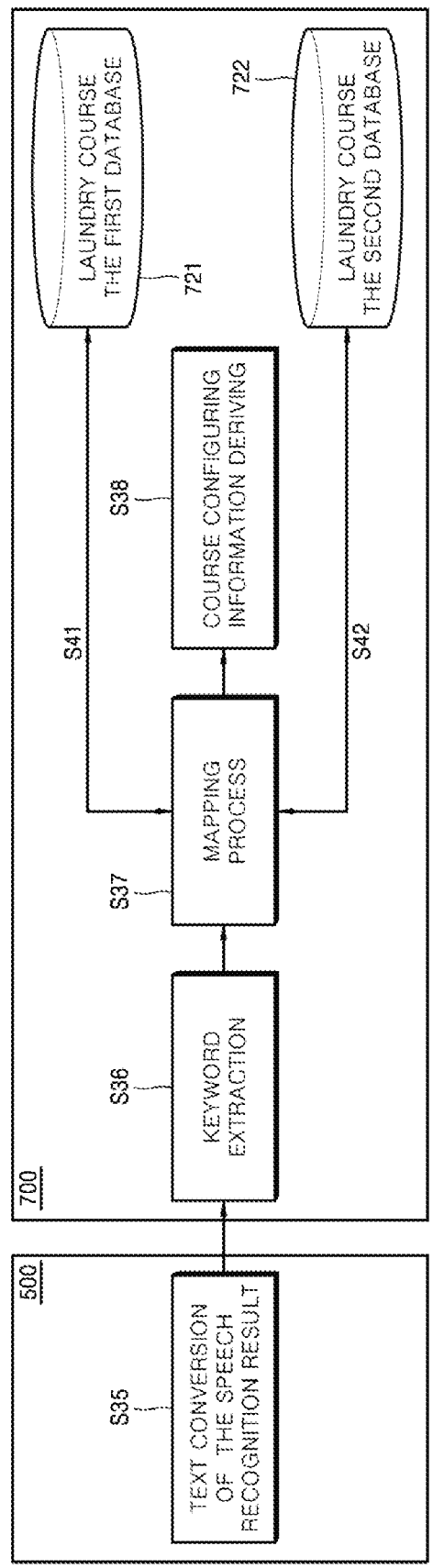
FIG. 6 shows a process of configuring a laundry course based on inputted washing information according to the invention.

FIG. 6 shows a process of configuring a laundry course based on inputted washing information according to the invention. An equipment control unit 710 of a central control server 700 or a control unit 250 of a washing machine 200 can perform the process of FIG. 6.

In FIG. 6, an operation of the central control server 700 will be described as follows. As previously described in FIG. 1, the equipment control unit 710 of the central control server 700 may search course configuring information applicable to the washing machine in a database by using a first keyword corresponding to a Stain Word, a second keyword corresponding to a Cloth Word, and identification information of a washing machine. The Stain Word may be a word that indicates a name of a stain, a color of a stain, or a chemical property of a stain. The Cloth Word may include a kind of laundry, a fabric name of laundry, or a color of laundry, as described above.

A first keyword may be the same as the Stain Word, or may be a word that is extracted from the Stain Word, or specifically mapped by the Stain Word. Likewise, a second keyword may be the same as the Cloth Word, or may be a word extracted from the Cloth Word or specifically mapped by the Cloth Word.

In one example, the user may utter "ketchoop"(wrong pronounciation of ketchup) to input it as the Stain Word. At this time, a speech server 500 or the central control server 700 may derive a first keyword of "Ketchup" from this word. In another embodiment, the user may utter "skit" to input it as the Cloth Word. At this time, the speech server 500 or the central control server 700 may derive a second keyword of "skart" (wrong pronounciation of skirt) from this word.

That is, in an implementation, a keyword may be a Stain Word or a Cloth Word extracted from the inputted speech. Further, in another implementation, the keyword is a word that is mapped or extracted based on the Stain Word or the Cloth Word extracted from the inputted speech.

The equipment control unit 710 may search course configuring information by using the keywords in the databases 721 and 722 as suggested in FIG. 6. A communication unit 730 of the central control server 700 may transmit the searched course configuring information to a washing machine 100 so that the washing machine 100 can be operated based on the course configuring information.

The speech server 500 of FIG. 6 may recognize the inputted speech and convert the speech data into a text. Converted text data (for example, a text file) may be transmitted to the central control server 700, and the equipment control unit 710 of the central control server 700 may extract a keyword in consideration of a type of device (a washing machine) to which the speech is inputted (S36). This is to extract a keyword suitable for a corresponding equipment when the central control server 700 controls various kinds of equipments.

The central control server 700 can search for a laundry course corresponding to an extracted keyword. In FIG. 6, in an example, the central control server 700 may include two databases in which information on a corresponding laundry course per keyword is stored. In the first database 721 and the second database 722, various utterance texts (a keyword combination) that can be inputted for the laundry course are stored as a table, and a corresponding laundry course may be configured.

In the first database 721, the information on a laundry course specialized for the corresponding washing machine may be stored. Information on a laundry course that the corresponding washing machine can provide for each specific type of washing machine may be stored. Therefore, in this case, it is possible to search course configuring information based on identification information of the washing machine.

On the other hand, the information on a standard laundry course may be stored in the second database 722, that the information is not provided by each washing machine. This means a laundry course that can be applied as a standard to all washing machines. In this case, it is possible to search course configuring information without identification information of the washing machine, or search course configuring information by using a part of identification information.

In more detail, the equipment control unit 710 of the central control server 700 may extract a keyword, and use the extracted keyword and the identification information of the washing machine, as in S41, to firstly determine whether there is a laundry course specialized for the washing machine in the first database 721 (a laundry course that the corresponding washing machine provides particularly) (S37). Then, the unit 710 may search the course configuring information corresponding to the first keyword (Stain Word) and the second keyword (Cloth Word) from the first database 721 in which the course configuring information is classified based on the identification information of the washing machine.

If there is a mapping between the keyword and the searched laundry course, it may derive course configuring information that controls the washing machine so as to configure the washing machine to operate the corresponding course (S38). As an example, the course configuring information may include a combination of any one or more of a washing strength of the washing machine, a temperature of water, a kind of detergent, an amount of detergent, or a contaminant removal strength of the laundry. Further, a course specific to the corresponding washing machine can be selected. For example, the washing machine may have a function of "boiling", and it may derive course configuring information that indicates the function when a mapping result is "boiling".

On the other hand, if there is no laundry course that can be mapped in the first database 721 as a result of performing a mapping process in S37, S42 proceeded. That is, when the identification information of the washing machine and the course configuring information corresponding to the first and second keywords are not searched in S41, it searches the course configuring information corresponding to the first keyword and the second keyword from the second database 722 in which general-purpose: course configuring information is stored. That is, it may determine whether there is a course that can be mapped in the second database 722 (542). As a result of the search, it may derive the course configuring information that controls the washing machine with the searched course (S38). For example, it is possible to derive a washing method in which a standard course is combined with at least an option (a rinsing, a dehydration, a water temperature, etc.) as course configuring information.

If there is no laundry course mapped anywhere in the first and second databases 721 and 722. It is possible to configure the washing machine to operate a standard laundry course.

The course configuring information may be transmitted to the washing machine, and the washing machine can output a notice message that operates by speech (a speech guidance, TTS) or by a text. It is possible to use a TTS unit 520 of the speech server 500 for a TTS output.

The contents described in FIG. 6 can be applied to the configuration of FIG. 1. Further, as in FIG. 2, when the speech recognition unit 210, the control unit 250, and the TTS unit 220 are arranged in a washing machine 200, it is possible to derive the course configuring information by exchanging the information between each of the components in the washing machine 200 without a separate external communication process.

The keyword extraction of FIG. 6 may be performed in the central control server 700 or in the speech server 500. Of course, the central control server 700 may also operate in a manner in which the central control server 700 and the speech server 500 are integrally coupled.

For example, the equipment control unit 710 may extract the first keyword and the second keyword from the text file that the washing machine 100 or the speech server 500 transmits.

When the communication unit 730 of the central control server 700 may receive the speech data from the washing machine 100, a separate speech recognition unit arranged in the central control server 700 may convert it into the text to extract the first keyword and the second keyword. This is an embodiment in which the component of the speech server 500 is included in the central control server 700.

On the other hand, when it is confirmed that any one of Stain Word or Cloth Word is not inputted, the equipment control unit 710 of the central control server 700 may produce the message that indicates the output of the guide message that requests the utterance of a Cloth Word or a Stain Word. As described in FIG. 5, when the Stain Word of "ketchup" is inputted, the equipment control unit 710 can generate a message that instructs the output of the guide message, so that the guide message that requests the kind of cloth is outputted as in S26. The communication unit 730 may transmit the generated message to the washing machine 100 or the speech server 500 and receive the keyword from the washing machine 100 or the speech server 500. In one embodiment, the received keyword is a keyword corresponding to any one of Stain Word or Cloth Word requested previously.

Figure 7:
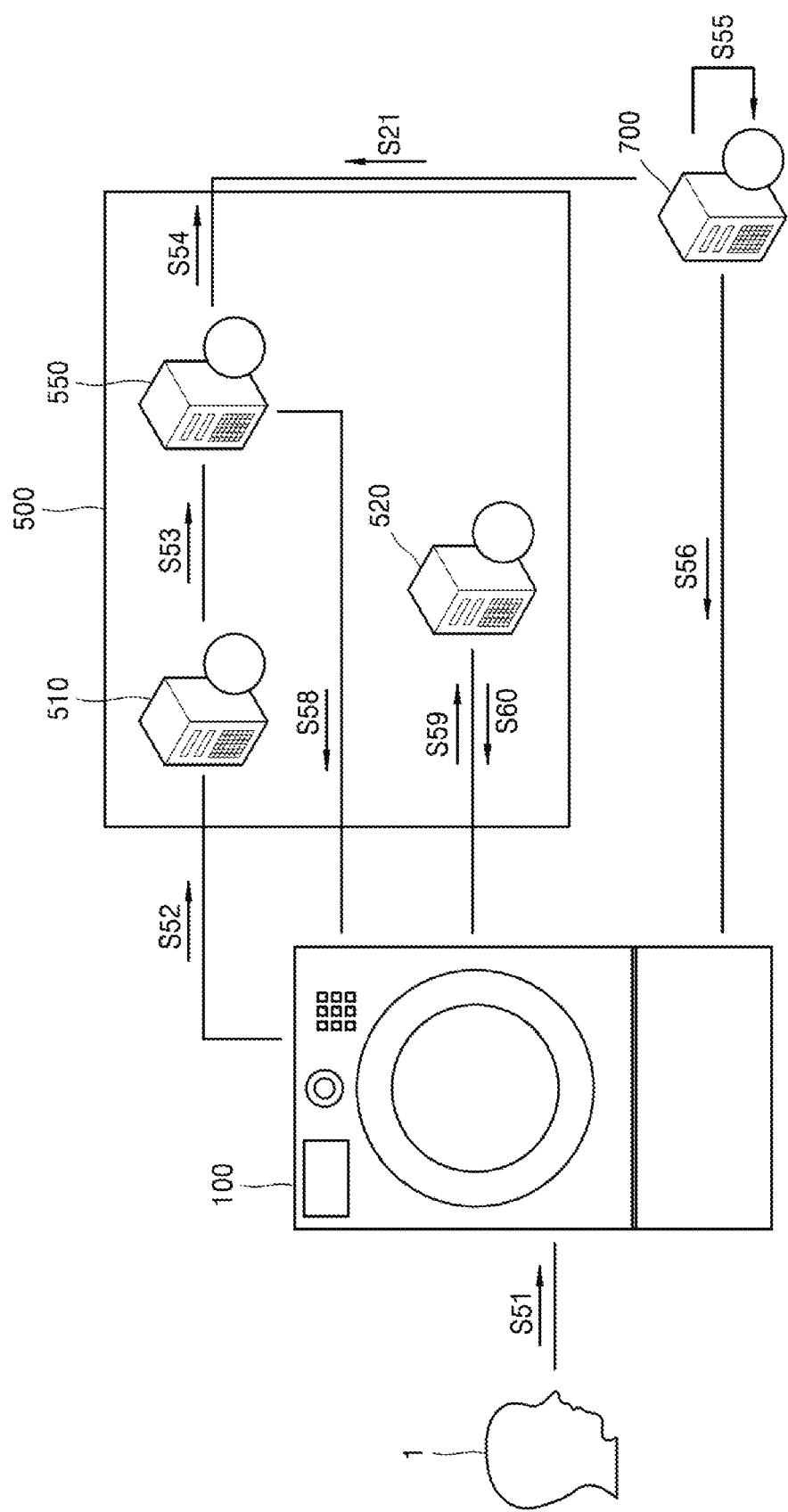
FIG. 7 shows a mutual operation between a speech server, a central control server, and a washing machine according to the invention.

FIG. 7 shows a mutual operation between a speech server, a central control server, and a washing machine according to another implementation of the invention. FIG. 7 shows that a Natural Language Processing (NLP) unit 550 is arranged in a speech server 500.

In the configuration of FIG. 7, a washing machine 100 may receive a speech of a user 1 (S51). An inputted speech may be converted into speech data and provided to the speech server 500 (S52). A speech recognition unit 510 of the speech server 500 may perform speech recognition on the speech data, and generate text data corresponding thereto, and provide it to the NLP unit 550 (S53). The NLP 550 can process a natural language, which is a language that a person routinely uses according to a NLP algorithm, and can analyze intention in utterances of a user. The NLP unit 550 (or a separate NLP server 112 (not shown in the figures)) can perform a NLP on the text data received from the speech recognition unit 510 (or an automatic speech recognition server 111 (not shown in the figures)) to distinguish a speech command that matches with the intention of the user. The NLP unit 550 may analyze a meaningful word in the distinguished speech command, i.e., the analyzed keyword is transmitted to a central control server 700 (S54). Of course, the NLP potion 550 may be implemented in an equipment control unit 710 of the central control server 700.

The central control server 700 may determine the laundry course information that can be configured by using the mapping process of FIG. 6 by using the keyword (S55). The determined laundry course information may be transmitted to the washing machine 100 (S56). Further, the central control server 700 may also provide the NLP unit 550 with the laundry course information so that the determined laundry course information can be provided to the user (S57).

The NLP unit 550 may convert the provided laundry course information into a notice message and transmit the notice message to the washing machine 100 (S58), and the washing machine may provide the provided notice message to a TTS unit 520 again (559) to receive a speech file of the notice message to be outputted (S60).

Of course, here, through an interaction between the central control server 700 and the speech server 500, it is possible to provide the speech file for speech guidance and the determined laundry course information in S56 process.

Alternatively, in a case in which a speech notice has a predetermined format and it is possible to generate the notice message in the washing machine 100, when the central control server 700 provides the laundry course information to the washing machine 100, the washing machine 100 can output the speech guidance corresponding to the given laundry course information.

According to another implementing method of this invention, as described in FIG. 2, all or a part of the components provided in 500 and 700 can be implemented within the washing machine, and some of the operations depicted in FIG. 7 may operate in one washing machine 200 or the washing machine 200 may provide some of results obtained by the operations to a server (a server including 500 and 700).

The prior Korean patent application 10-2017-0110319 that the applicant of this application filed previously proposes the technology that, when a user utters a kind of cloth, a laundry course is configured in response to that. This will be briefly described in FIG. 8.

Figure 8:
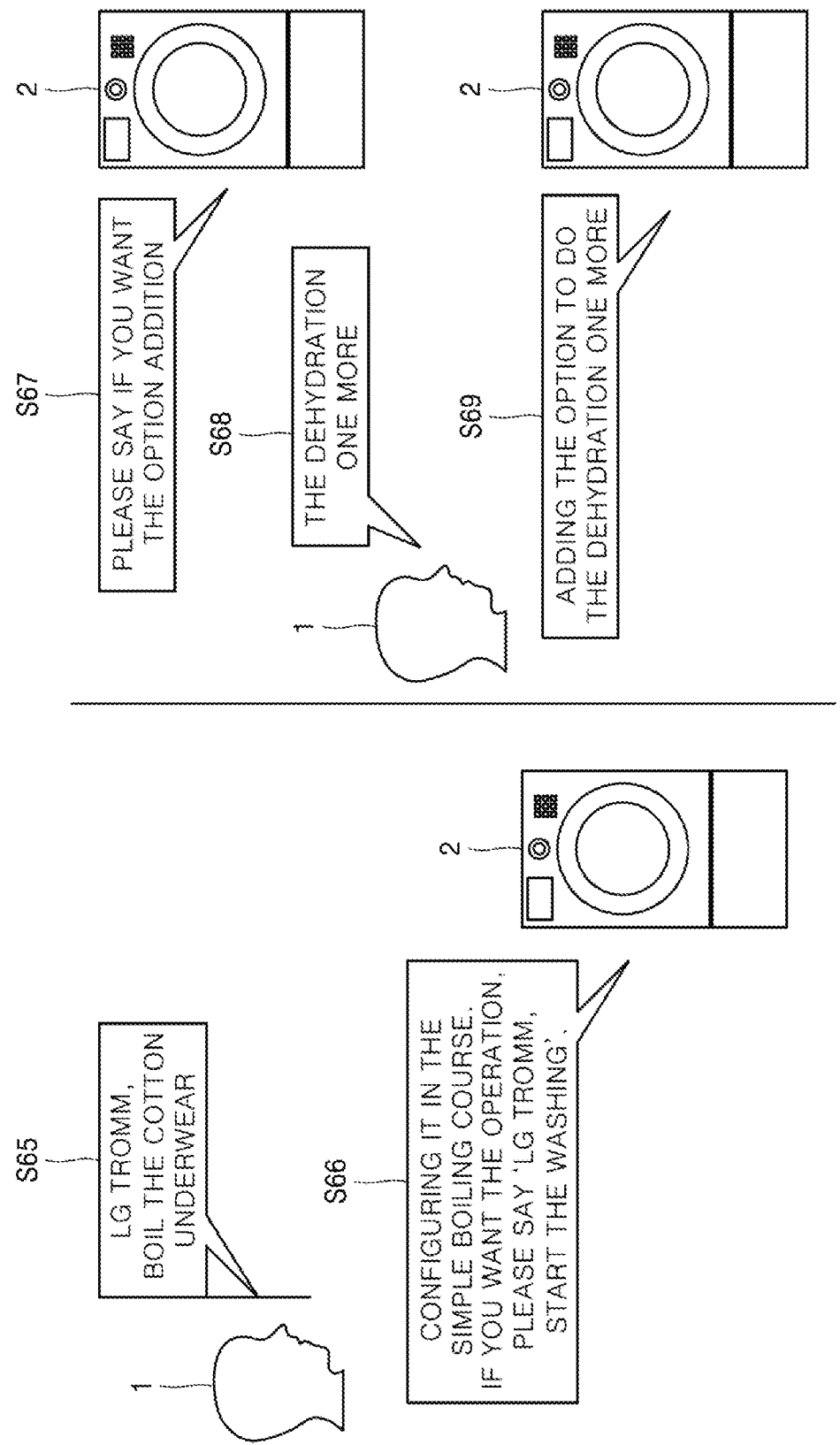
FIG. 8 shows a process in which a user instructs a specific operation to operate the washing machine.

FIG. 8 shows a process in which a user instructs a specific operation to operate a washing machine. In FIG. 8, when a user 1 specifically utters "LG tromm, boil cotton underwear" (S65), a washing machine 2 may output the configuration of a simple boiling course suitable for boiling, and in response to that, the washing machine 2 may request the user to utter "LG tromm, start a washing", as an instruction to start an operation (S66).

In a case in which an option for the boiling course is required, when the washing machine 2 may guide the user to add an option (S67), and the user 1 may utter "do the dehydration cycle one more" (S68), the washing machine 2 may output a guidance speech of "adding the option so as to do the dehydration cycle one more" (S69) to perform a washing.

In a configuration in FIG. 8, the user has to decide a kind of washing method that the user wants by oneself. The "boiling" washing method for cotton underwear has to be specifically instructed so that the washing machine 2 operates according to the instructed washing method. However, when the present invention is applied, since the washing machine may be able to configure a laundry course suitable for present laundry in response to that the user provides information on a kind of laundry (fabric) and a kind of stain on the laundry, the user does not need to know which course out of available laundry courses, such as "boiling course" or "wool course", is suitable for a specific kind of stain or specific kind of cloth in advance.

In other words, since the technology described in FIG. 8 does not utilize detailed information on laundry, such as a degree of contamination other than a kind of cloth, and convert such detailed information into a specific course, it merely provide a simple and general guide. To the contrary, since this invention utilizes such detailed information to determine a laundry course and necessary options thereof, there is an advantage of being able to determine a laundry course and adjust a washing option for the determined laundry course, which are most suitable for the present laundry.

Figure 9:
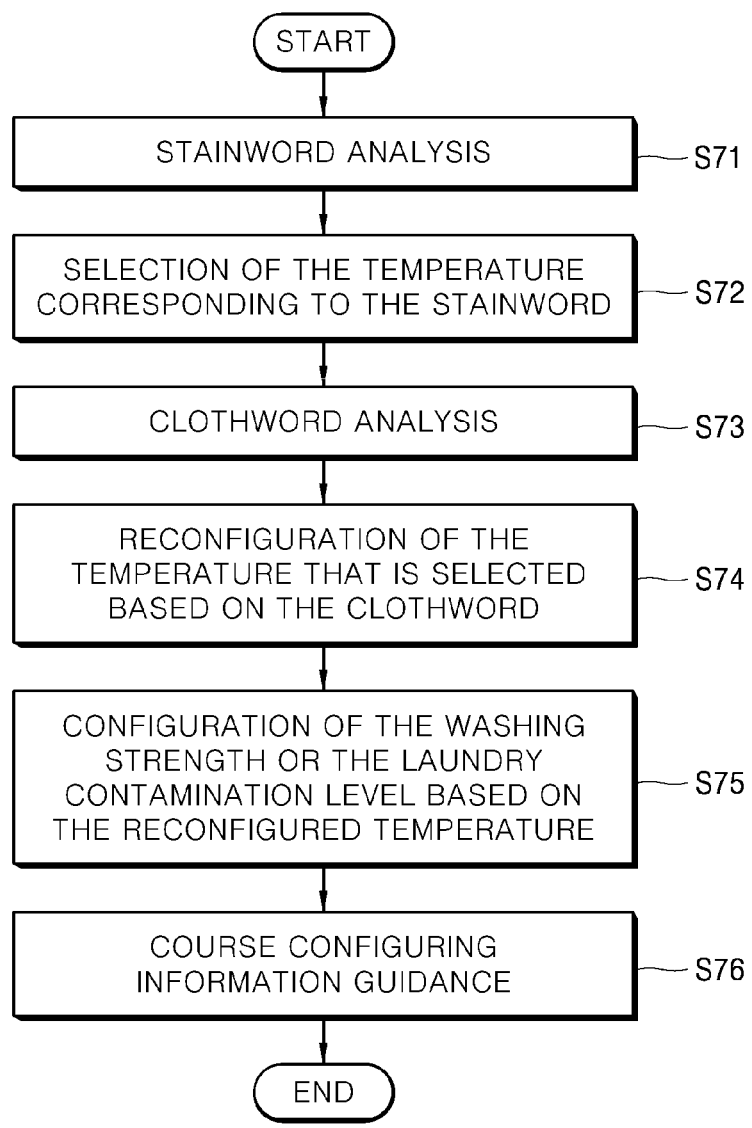
FIG. 9 shows a process in which course configuring information is selected based on various input information according to an exemplary implementation.

FIG. 9 shows a process in which course configuring information is selected based on various input information according to the invention.

The course configuring information can be selected based on a Stain Word and a Cloth Word. Further, the Stain Word can be subdivided into information on a property of a contaminant itself, information on a level of contamination (level), information on a contaminated time, etc.

An operation of FIG. 9 can be performed in an equipment control unit 710 of a central control server 700 or a control unit 250 of a washing machine 200.

The equipment control unit 710 or the control unit 250 may analyze the Stain Word (S71). Then, it may select a temperature corresponding to the Stain Word (S72). In this process, a keyword may be extracted from the Stain Word.

A temperature corresponding to a Stain Word means a temperature of water that is configured in the case in which a Stain Word that indicates a special source of contaminant is inputted. For example, when the equipment control unit 710 or the control unit 250 analyzes that a contaminant source on laundry can be removed in hot water, it may configure the temperature of water as "HOT". On the other hand, the equipment control unit 710 or the control unit 250 analyzes that the contaminant source can not be easily removed by hot water, it may configure the temperature of the water as "WARM". For example, it can configure a water temperature to "WARM" for a material that has a property that is solidified or spread in the hot water. When a Stain Word allowing to easily derive a keyword for a contamination source, such as vegetable (Vegetable stain), cola, soy sauce, mud, rust, egg, chocolate, etc., is inputted, the equipment control unit 710 or the control unit 250 may configure the temperature of the water as "WARM".

After the analysis of the Stain Word, the equipment control unit 710 or the control unit 250 may analyze the Cloth Word (S73). The Cloth Word can be a kind or a color of the laundry. For example, when there is a course that the washing machine provides corresponding to the specific kind of the laundry, the corresponding course may be included in the course configuration information. In this process, it is possible to selectively proceed with a step of reconfiguring the previously selected temperature. That is, it may reconfigure the selected temperature based on the Cloth Word (S74). In one embodiment, after configuring the temperature of the water as "Hot" as the contamination source is "Grass" in S72, and after it is confirmed as "Sportswear" in a process of analyzing the Cloth Word, when the course corresponding to "Sportswear" is provided, the equipment control unit 710 or the control unit 250 can reconfigure the temperature based on the above. For example, it may configure the temperature of water as "Normal". The equipment control unit 710 or the control unit 250 may configure a washing strength or a laundry contaminant level based on the reconfigured temperature (S75). Then, it may provide to the user the course configuring information finally determined (S76). When an option combination range of the washing machine course does not meet a condition of the water temperature for washing a special contaminant, that the contaminant and water temperature are provided at the steps S74 and S75, Normal course can befirstly applicable.

In FIG. 9, it may firstly perform an analysis of the Cloth Word than that of the Stain Word. This analysis order can be varied according to an order of uttered words or a priority of washing.

Figure 10:
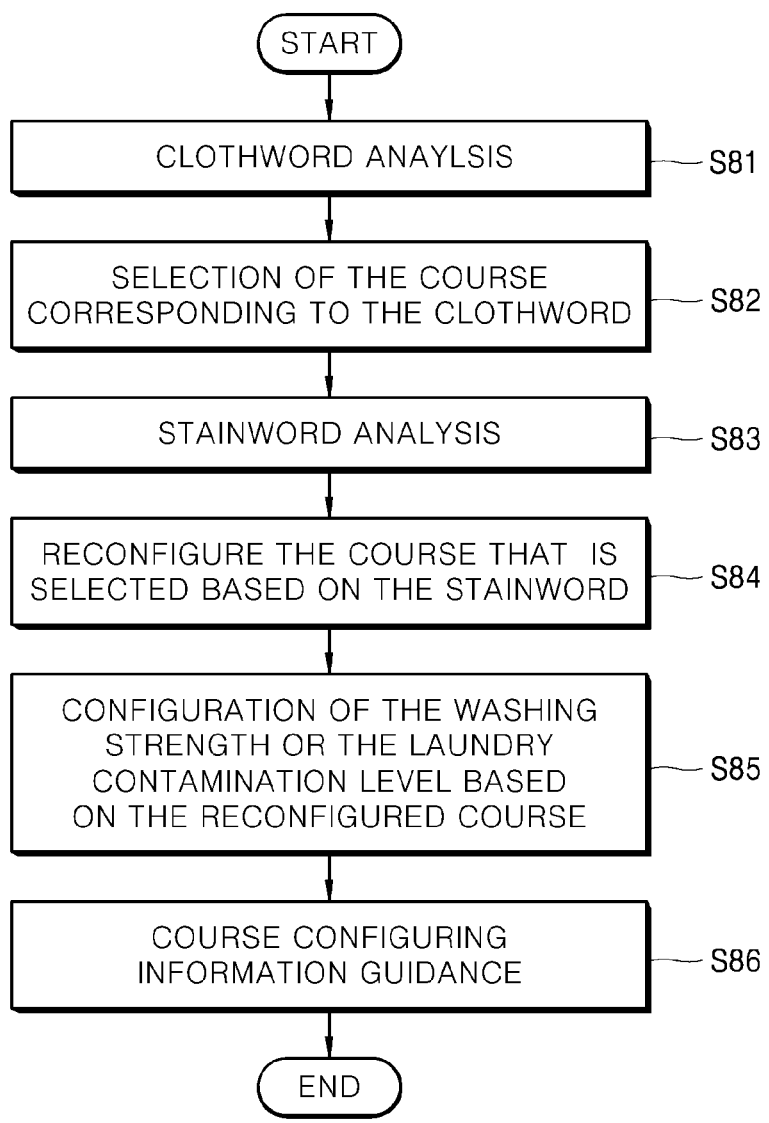
FIG. 10 shows a process of analyzing a Cloth Word first and analyzing a Stain Word in the next to configure a laundry course according to another implementation.

FIG. 10 shows a process of analyzing a Cloth Word first and analyzing a Stain Word in the next to configure a laundry course according to another implementation of the invention.

Course configuring information can be selected based on a Stain Word and a Cloth Word. Further, the Stain Word can be further subdivided into information on the property of the contaminant itself, information on a level of contamination (level), information on a contaminated time, etc.

An operation in FIG. 10 may be performed in an equipment control unit 710 of a central control server 700 or a control unit 250 of a washing machine 200. The equipment control unit 710 or the control unit 250 may analyze the Cloth Word (S81). It may select a course corresponding to the Cloth Word (S82). In this process, it is possible to extract a keyword from the Cloth Word.

A course corresponding to a Cloth Word means a laundry course that is configured when a Cloth Word that indicates a kind of laundry (fabric) specified as a specific laundry course is inputted. A temperature of water and a washing strength may be determined, for example, for sports wear or comforters. When the Cloth Word that indicates such a specific laundry is inputted, it can configure the laundry course corresponding thereto.

Thereafter, the equipment control unit 710 or the control unit 250 may analyze the Stain Word (S83). It may reconfigure the selected course in consideration of the Stain Word (S84). In this step, it is possible to extract the keyword from the Stain Word.

A meaning of reconfiguring a course in response to the Stain Word means applying a change within a predetermined range of options for the course selected based on the Cloth Word described above. For example, although a contaminant can be easily removed in "HOT" water, when a laundry course determined based on the Cloth Word is only set to use water in "Normal" temperature, it is possible to adjust options for the determined laundry course to increase a washing strength (for example, Spin) instead of a temperature instead. Further, when a degree of contamination or a contaminated time is determined large based on the Stain Word, it is possible to increase the washing strength.

Then, the equipment control unit 710 or the control unit 250 may configure a washing strength or a laundry contamination level based on the reconfigured course (S85).

Then, it may provide to the user the course configuring information finally determined (S86). When an option combination range of the washing machine course does not meet a condition of a water temperature for washing the special contaminant, that the contaminant and water temperature are provided at S84 and S85, Normal course can be firstly applicable.

FIGS. 9 and 10 will be summarized as follows.

When a required course and option are determined by an input of special contaminant source, a kind of laundry, a contaminant level, etc., and the conditions above, a remaining option can be determined according to a default configuring value preset for each course. For example, if the course of washing machine is preset as the normal course, it is possible to change a wash strength (Spin) to a high value (High).

The Cloth Word and the Stain Word can be inputted in separate sentence and a separate input step, but they can be inputted in one sentence at a time. For example, it is possible to extract both the Cloth Word and the Stain Word from a single utterance, such as "Blouse with Ketchup".

Figure 11:
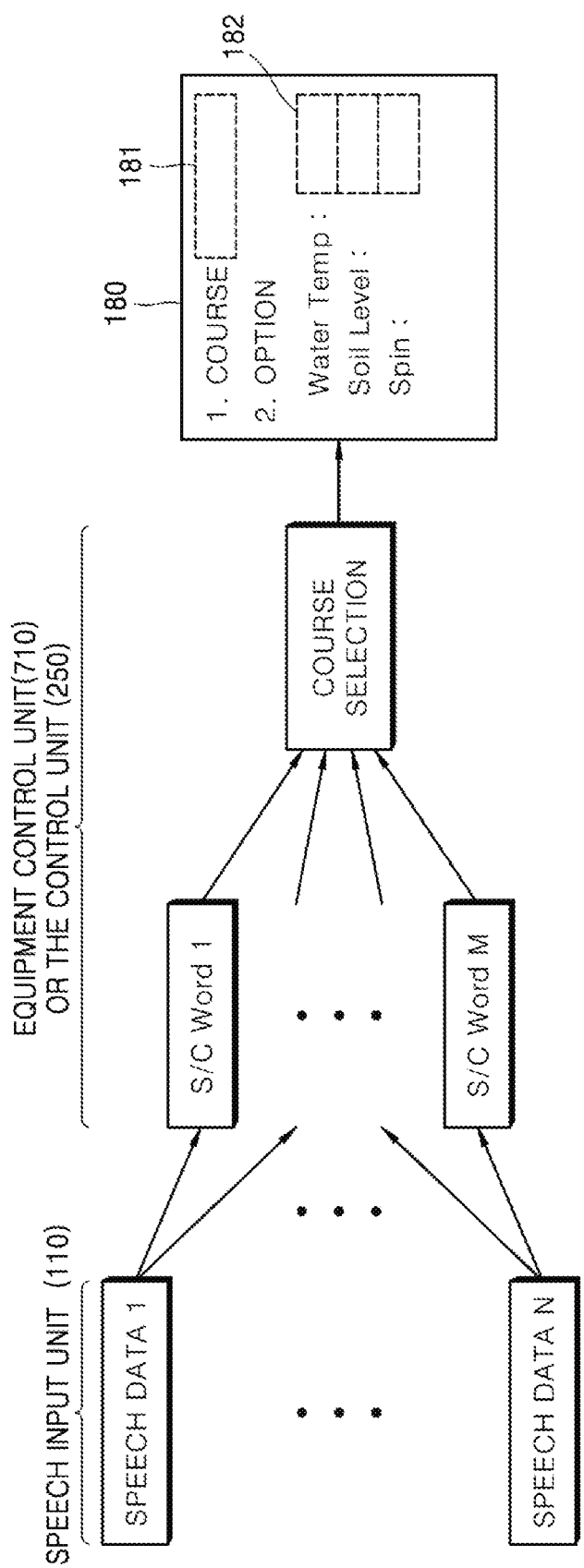
FIG. 11 shows a course determination process according to the invention.

FIG. 11 shows a course determination process according to the invention.

A speech input unit 110 may generate N pieces of speech data, and M pieces of Stain or Cloth Words (S/C words) are determined through a speech recognition process. An equipment control unit 710 or a control unit 250 may select a course by using one or more out of the determined S/C words and an interface unit 180 may output a course, at least one option item for the course, and course configuring information finally determined for the option item. 181 is an area in which a course is displayed, and 182 is an area in which the option results (i.e., course configuring information) are displayed.

A matching of an output (or guided) course, option items for the output course (i.e., water temperature, soil level, spin, pre-wash), and course configuring information for the option items is as follows.

TABLE 2

| Case | Speech data1 | Speech data2 | Interface |
|---|---|---|---|
| 1 | Grass Strains | Sports wear | 1. Course: Heavy Duty<br>2. Option<br>   Water temp.: Warm<br>   Soil Level: Heavy<br>   Spin: High |
| 2 | Normal Clothes | Heavy | 1. Course: Normal<br>2. Option<br>   Water temp.: Warm<br>   Soil Level: Heavy<br>   Spin: High |
| 3 | Comforters | Light | 1. Course: Bedding<br>2. Option<br>   Water temp.: Warm<br>   Soil Level: Light<br>   Spin: Medium |
| 4 | Coffee | Table Cloth | 1. Course: Perm. Press<br>2. Option<br>   Water temp.: Hot<br>   Soil Level: Normal<br>   Spin: Medium |
| 5 | Ketchup | Blouse | 1. Course: Normal<br>2. Option<br>   Water temp.: Hot<br>   Soil Level: Normal<br>   Spin: High |
| 6 | Baby Clothes | Light | 1. Course: Normal<br>2. Option<br>   Water temp.: Hot<br>   Soil Level: Light<br>   Spin: High<br>   Pre Wash: applied |

Table 2 shows that a kind of laundry, and a contamination level or a contaminant source are inputted as speech data 1 or speech data 2, and course configuring information is outputted in response to that.

In the case of "Case 1", when "grass strains" as a contaminant source and "Sports wear" as a kind of laundry are inputted, course configuring information that indicates a course and an option thereof is determined. In "Case 1", the temperature of water has to be "Hot" for the contamination source; however, since there is a special course according to "sports wear", which is the ClothWord, the temperature of the water is changed to "Warm", and accordingly, it configures a washing strength (Spin) to be High.

In the case of "Case 2", when "Heavy" as a contamination level and "Normal Clothes" as a kind of laundry are inputted, course configuring information that indicates a course and an option thereof is determined. In "Case 2", the laundry course is configured to be "Normal" course with regard to "Normal Clothes" and soil level has to be "Normal", but soil level may be configured to be "Heavy" because the contamination level is "Heavy", and accordingly, it may configure a washing strength (Spin) to be "High".

In the case of "Case 3", when "Light" as a contamination level and "Comforters" as a kind of laundry are inputted, course configuring information that indicates the course and the option thereof may be determined. In "Case 3", a "Bedding" course has to be configured for "Comforters" and the soil level has to be "Normal", but the soil level was configured to be "Light" in that the contamination level is "Light".

In the case of "Case 4", when "coffee" as a contamination source and "Table Cloth" as a kind of laundry are inputted, course configuring information that indicates a course and an option thereof is determined. In "Case 4", "Perm.Press" may be configured as a special course for "Table Cloth" which is the Cloth Word, and in this case, although the temperature of the water is "Warm", it may be configured to be "Hot" to correspond to "coffee", which is a contamination source.

In the case of "Case 5", when "ketchup" as a contamination source and "Blouse" as a kind of laundry are inputted, course configuring information that indicates a course and an option thereof is determined. In "Case 5", it may be configured to "Normal" for the course according to "Blouse" which is the ClothWord, and in this case, although a temperature of water is "Warm", it is configured to "Hot" to correspond to "Ketchup" which is a contamination source.

In the case of "Case 6", when "Light" at a level of contamination and "Baby Clothes" as a kind of laundry are inputted, course configuring information that indicates a course and an option thereof is determined. In "Case 6", "Baby Clothes" course can be configured for "Baby clothes", In this case, a default option is "Hot" for a temperature of water, "High" for the spin, and "Normal" for the soil level, and it is possible to apply prewash. However, as a contamination level is inputted as "Light", it may configure the value of "Soil Level" to be "Light".

Table 2 shows an embodiment in which a detailed option of a course is changed while a predetermined course is configured according to the inputted Cloth Word and Stain Word.

In summary, the equipment control unit 710 of a central control server 700 may search course configuring information that can be applied to the washing machine in a database by using a first keyword corresponding to the Stain Word, a second keyword corresponding to the Cloth Word, and identification information of a washing machine. The example of searched course configuring information and the keywords used for search is suggested in Table 2. Then, calculated course configuring information may be transmitted to a washing machine 100 by a communication unit 730 of the central control server 700.

Figure 12:
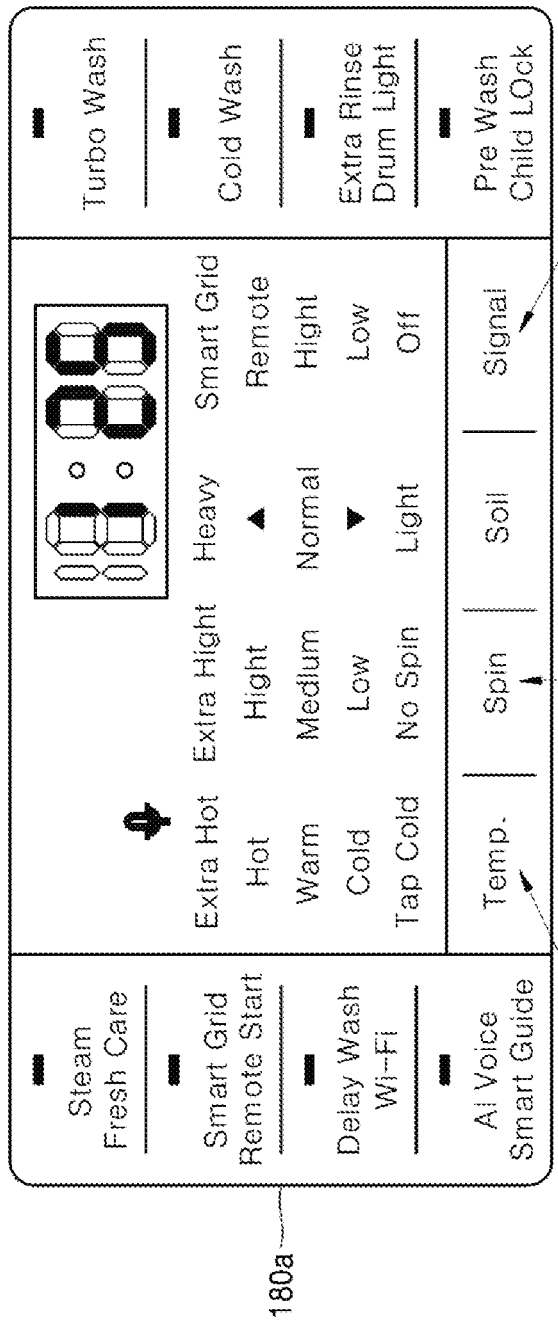
FIG. 12 shows a screen outputted to an interface according to the invention.

FIG. 12 shows a screen outputted to an interface according to the invention.

An interface 180a may display a temperature of water (Temp), a washing strength (Spin), and a contamination level (Soil), and can be configured in response to various Stain Words and Cloth Words as shown in Table 2 above. The interface may also be able to do a speech guidance of configured information.

In addition to that, functions represented by Delay Start, Steam, Prewash, Extra Rinse, Turbo Wash, Fresh Care and Cold Wash, etc., can be applied.

Hereinafter, various embodiments in which a washing machine operates will be described. As described above, an operation process of the washing machine will be summarized as follows.

A speech input unit 110 of a washing machine 100 may receive or obtain a speech of user including any one or more of a Stain Word that indicates a kind of stain or a Cloth Word that indicates a kind of laundry to generate speech data, and the communication unit 130 of the washing machine 100 may transmit identification information of a washing machine and the speech data to a first server. Here, the first server may be a speech server 500, or may be a central control server 700 including a speech server function.

Thereafter, the communication unit 130 may receive the course configuring information corresponding to a Stain Word and a Cloth Word from any one of the first server or a second server that is distinguished with the first server. The first server and the second server can be provided separately, Or, the first server and the second server can be incorporated in one sever machine. One of the first server or the second server provides a speech function Then, a speech guidance unit 120 of the washing machine 100 may output a speech guide message that notifies the user of a laundry course corresponding to the course configuring information. It will be described for this process.

Figure 14:
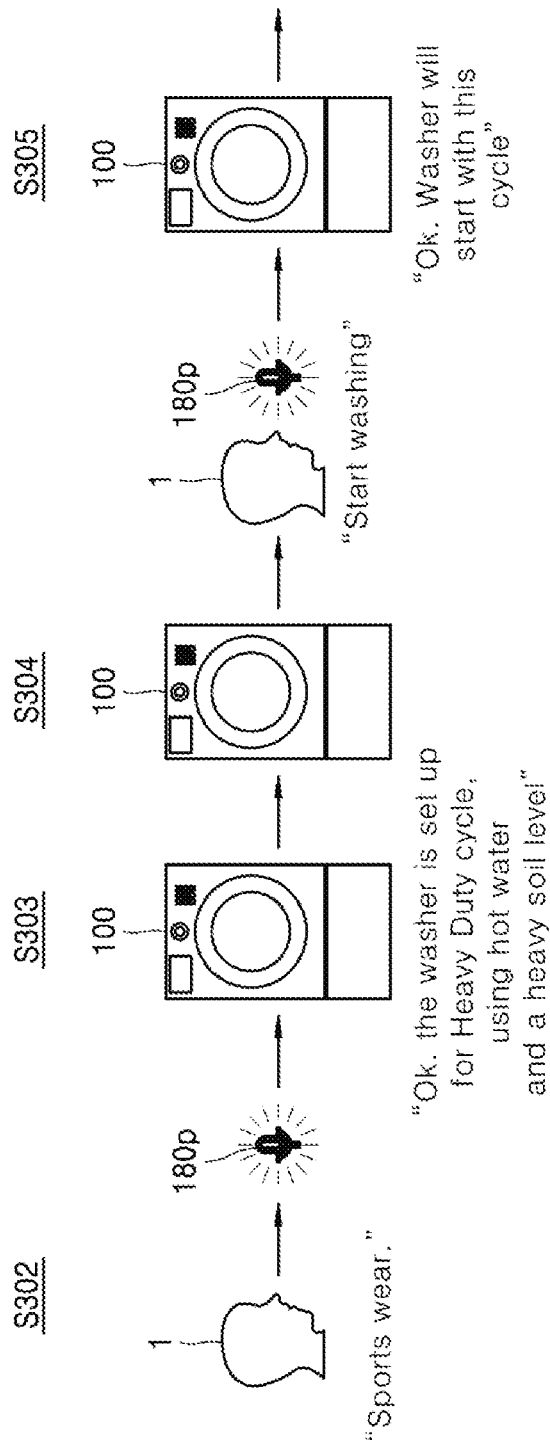

FIGS. 13 and 14 show a process in which speech recognition is performed in a washing machine according to the invention.

When a user 1 utters "Hi, LG", a microphone pictogram 180p of an interface unit 180 may flicker so as to display the process of speech recognition. Thereafter, when the user 1 utters "Power on washer", a state of speech recognition is displayed while the microphone pictogram 180p flickers in response to this. Then, a speech guidance unit 120 (not shown) of a washing machine 100 may output "Power is on" in response to inputted speech data, and a washing machine is powered on.

Next, the user utters a Stain Word. For example, when the user utters "Hi LG, remove grass stains" (S300), inputted speech data may be transmitted to a speech server 500 or a central control server 700 that has a speech recognition function. Alternatively, it is possible to provide a speech recognition function in the washing machine.

When an input of the Stain Word is confirmed as a result of the speech recognition, in the washing machine 100, the speech recognition unit 120 (not shown) of the washing machine 100 may output a notice message that requests an input of a Cloth Word as "Ok, can you describe the cloth?" (S301). In response to this, the user may utter a kind of laundry, and if the speech recognition cannot be performed, the speech guidance unit 120 (not shown) of the washing machine 100 can guide the user as "Sorry, I did not understand. Please try again" as in S311.

On the other hand, if an additional speech is not inputted within a preset constant period (for example, 6 seconds), the speech guidance unit 120 (not shown) of the washing machine 100 may guide the user as "Sony, I did not hear anything. Please try again."

FIG. 13 shows a process of performing a speech guidance that requests a Cloth Word to be inputted after the StainWord has been inputted, so that the Stain Word and the Cloth Word are inputted as information during the course configuring required for the washing machine to be operated. In this process, when an error occurs in the speech recognition or the speech input is not made, it is possible to proceed with a process of S311 or S312.

On the other hand, after the guidance in S301, a process in which the user inputs a speech will be described in FIG. 14.

FIG. 14 is an example in which a user utters a specific Cloth Word after S301 in FIG. 13. A user 1 may utter "Sports wear" to input a Cloth Word (S302). A washing machine 100 may receive course configuring information from a central control server 700 in response to the Stain Word and the Cloth Word inputted in S300 and S302 in the above, and a speech guidance unit 120 (not shown) may provide course configuring information (S303) to the user, like "Ok. the washer is set up for Heavy Duty cycle, using hot water and a heavy soil level".

In this case, the user can confirm a provided content and readjust a part of an option or a course as in S304, Then, when the user 1 utters "Start washing", in response to that, the speech guidance unit 120 (not shown) of a washing machine 100 may guide the user as "Ok. Washer will start with this cycle" and then may be operated.

A microphone pictogram 180p may flicker in response to the utterance of the user.

Figure 15:
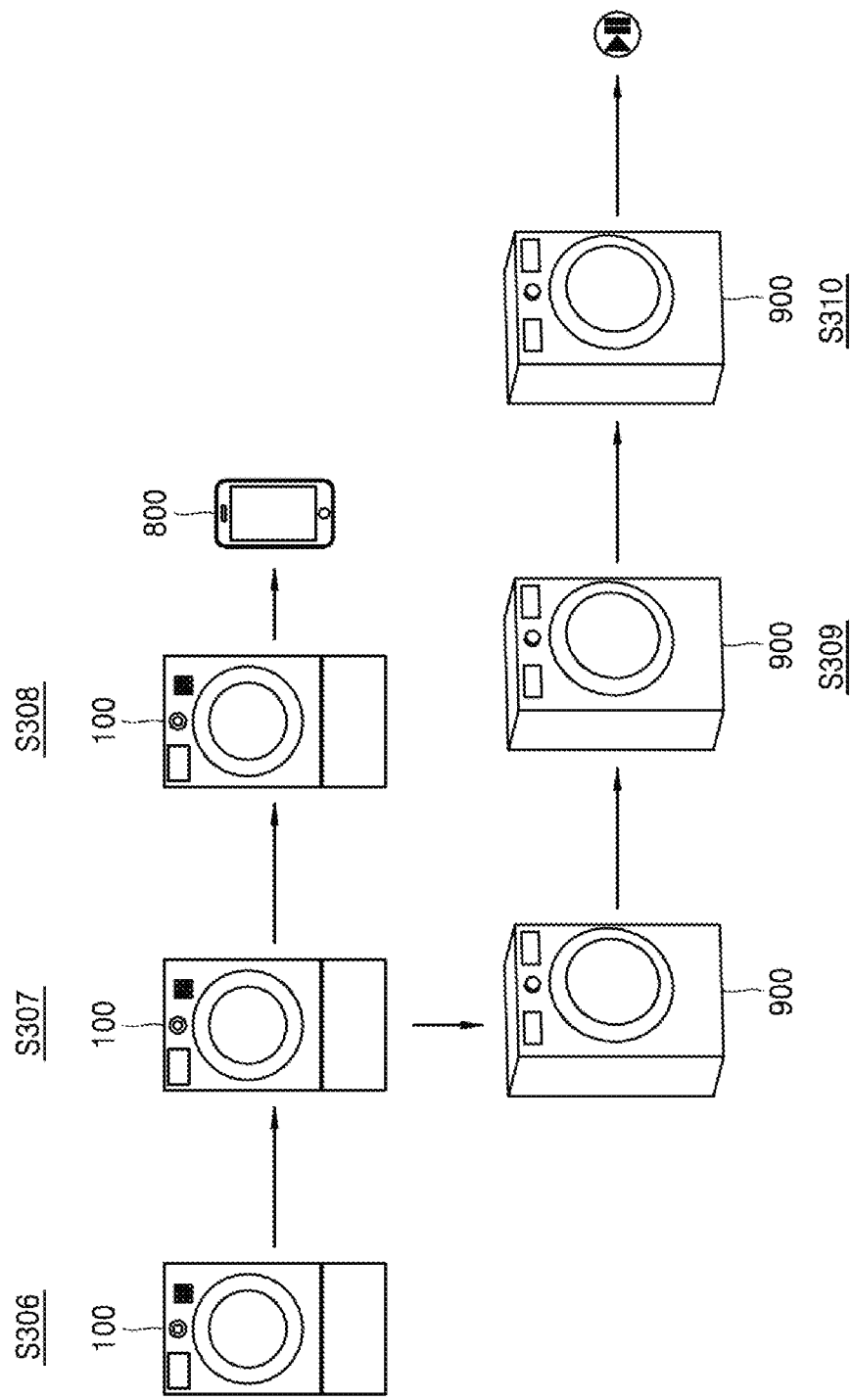
FIG. 15 shows a process of transmitting an operation result of a washing machine to other equipment according to the invention.

FIG. 15 shows a process of transmitting an operation result of a washing machine to another equipment according to the invention. After a washing machine 100 is operated (S306) and the washing is completed, a communication unit 130 of the washing machine 100 may transmit washing data, such as a Cloth Word and a Stain Word inputted during washing, a keyword derived therefrom, or an option and course configured during washing, via a central control server 700 or other server, or directly to a laundry dryer (clothes dryer) (S307).

Meanwhile, a laundry dryer 900 may display that data is received from a washing machine (S309). For example, the Remote Start indicator light flickers to indicate that the laundry dryer 900 is receiving data. When a data reception is completed, it may turn off a Remote Start indicator light, and turn on a power to output a notice. In this process, it may configure an optimum course according to a guidance phrase received from the washing machine 100, and output a course, an option, a time, etc., through an interface unit of a laundry dryer (S309). Thereafter, after the user moves the laundry to the laundry dryer, it may start an operation of the laundry dryer 900 after the user modifies a configuration outputted from S309 above (S310).

When an operation of the equipments 100 and 200 is terminated, information is transmitted and received between the equipments 100 and 200, and the equipment 200 operates as exemplified in S307, or S308 and S309, the equipments 100 and 200 may transmit a guide message which received by a cell phone or a smartphone 800, etc., of the user, so that the user can confirm that a washing course has been completed, or the cell phone may display an operation which can proceed after washing course. For example, a phrase such as "the washing is terminated, and a drying course is configured based on a laundry course. Please move the laundry from the washing machine to the laundry dryer" can be displayed. Alternatively, a phrase may be displayed on a display panel of a refrigerator or TV that the user is currently watching.

FIG. 15 is summarized as follows. In the washing machine 100, it may accumulate a weight difference of a wet laundry and a dried laundry and laundry characteristic information for each step and store them. The information may be transmitted to the laundry dryer 900 and be applied as an automatic configured value (control information) when the laundry dryer operates.

Figure 16:
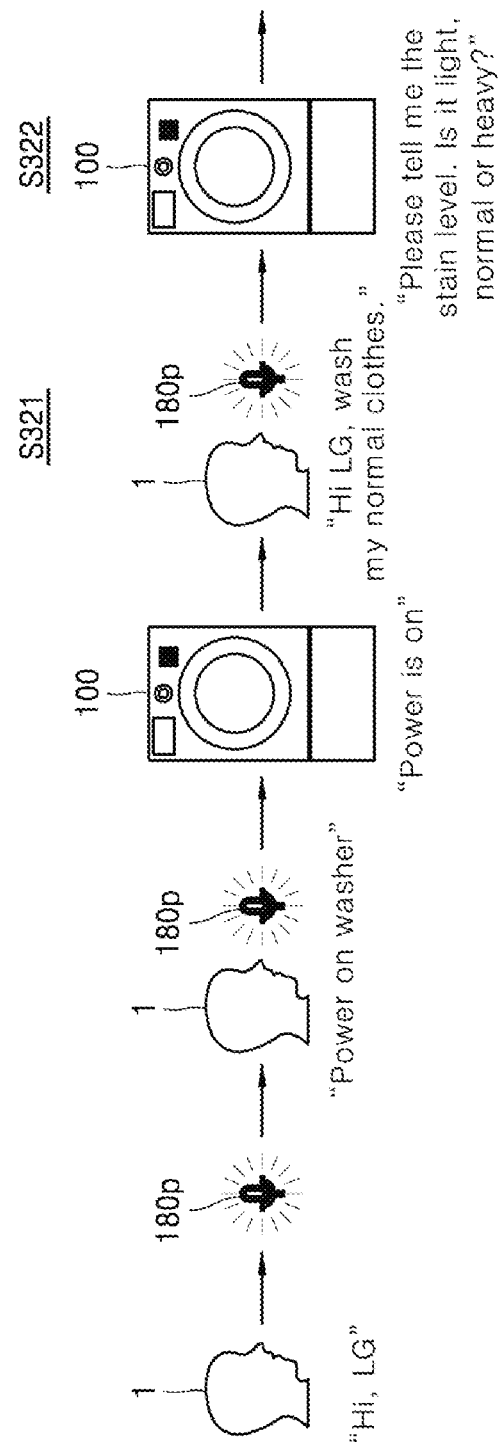
FIGS. 16 and 17 show a process in which a speech recognition is performed in a washing machine according to the invention.
Figure 17:
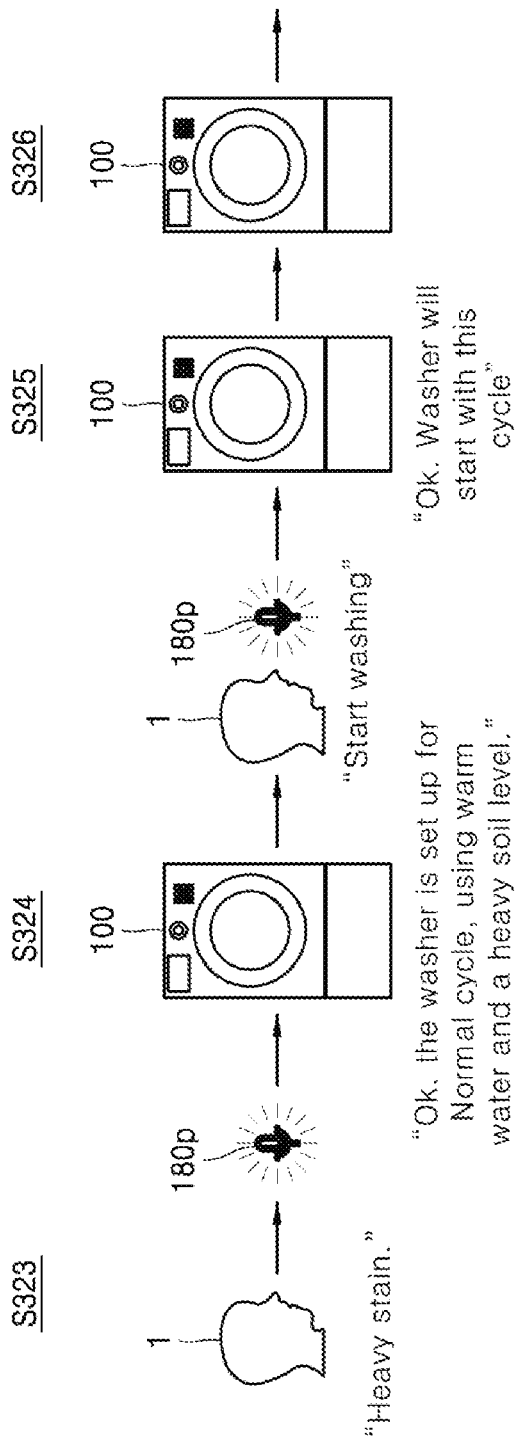

FIGS. 16 and 17 show a process in which speech recognition is performed in a washing machine according to the invention.

It is described in FIG. 13 that a user 1 may utter "Hi, LG" and "Power on washer" to turn on a power of a washing machine.

Next, the user may utter a Cloth Word. For example, the user may utter "Hi LG, wash my normal clothes." (S321), and the inputted speech data may be transmitted to a speech server 500 or a central control server 700 that has a function of speech recognition. Alternatively, it is possible to provide the speech recognition function in a washing machine.

When an input of the Cloth Word is confirmed as a result of speech recognition, in a washing machine 100, a speech guidance unit 120 (not shown) of the washing machine 100 may output a notice message that requests an input of the Stain Word as "Please tell me the stain level. Is it light, normal or heavy?" (S322). In response to this, the user may utter a degree of contamination, and if it cannot do the speech recognition, the speech guidance unit 120 (not shown) of the washing machine 100 can guide the user as "Sorry, I did not understand. Please try again" as in S311 in FIG. 13 in the above.

On the other hand, when additional speech is not inputted within a preset constant period (for example, 6 seconds), the speech guidance unit 120 (not shown) of the washing machine 100 may guide the user as "Sorry, I did not hear anything. Please try again".

FIG. 16 shows a process that performs the speech guidance that requests a user to input the Stain Word after the Cloth Word has been inputted, in order to receive a Cloth Word and a Stain Word as information necessary for configuring a laundry course operated by the washing machine. It is described that it is possible to proceed with the process of S311 or S312 of FIG. 13 in a case in which an error occurs in the speech recognition or the speech recognition is not made, in this process.

On the other hand, a process of inputting a speech for a user after the guidance in S322 will be described in FIG. 17.

FIG. 17 shows that a user utters a specific Stain Word after S322 in FIG. 16. A user 1 may utter "Heavy Stain" as an input of a StainWord (S323). A washing machine 100 may receive course configuring information from a central control server 700 in response to the Cloth Word and the StainWord inputted in S321 and S323, and a speech guidance unit 120 (not shown) may notify the course configuring information, like "Ok. the washing machine is set up for Normal cycle, using warm water and a heavy soil level".

In this case, when the user 1 may confirm a guided content and utter "Start washing" without modifying a suggested course or option, in response to that, the speech guidance unit 120 (not shown) of the washing machine 100 may guide the user as "Ok. Washing machine will start with this cycle" (S325). Then, the washing machine may start an operation (S326).

After step S326, it is possible to proceed with the step described in FIG. 15.

Figure 18:
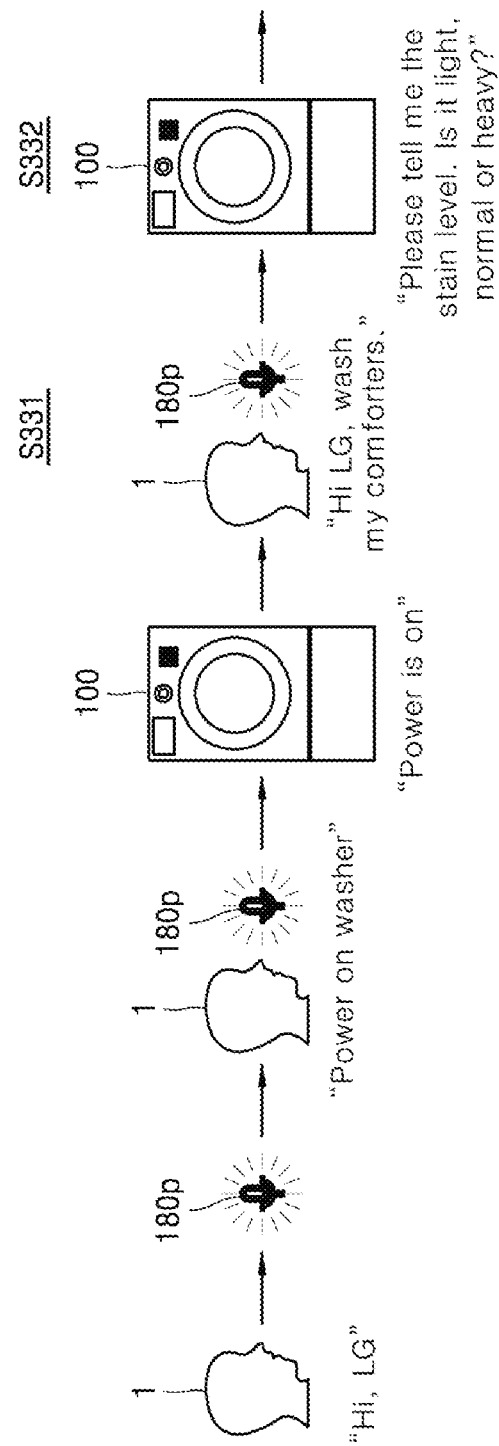

FIGS. 18 and 19 shows a process in which speech recognition is performed in a washing machine according to the invention.

A process of operating a washing machine 100 by speech until the previous step of S331 may replace the process of FIGS. 13 and 16 in the above.

When a power of the washing machine 100 is turned on, a user may utter a Cloth Word. For example, when the user may utter "Hi LG, wash my comforters." (S331), the inputted speech data may be transmitted to a speech server 500 or a central control server 700 that has a function of speech recognition. Alternatively, it is possible to provide the speech recognition function in the washing machine.

When an input of the Cloth Word is confirmed as a result of the speech recognition, in the washing machine 100, the speech guidance unit 120 (not shown) of the washing machine 100 may output a notice message that requests an input of the Stain Word as "Please tell me the stain level. Is it light, normal or heavy?" (S332). In response to this, the user can utter a degree of contamination, if it cannot do the speech recognition, it is possible to guide the user as in S311 of FIG. 13, and if a speech is not inputted, it is possible to guide the user as in S312 of FIG. 13.

Meanwhile, a process in which the user inputs the speech after the guidance in S332 will be described in FIG. 19.

FIG. 19 shows an example in which a user utters a specific Stain Word after S332 in FIG. 18. A user 1 may utter "Light Stain" to input the Stain Word (S333). A washing machine 100 may receive course configuring information from a central control server 700 in response to a Cloth Word and a Stain Word inputted in S331 and S333 in the above, and a speech guidance unit 120 (not shown) may notify the course configuring information like "Ok. The washing machine is set up for Bedding cycle, using warm water and a light soil level".

In this case, when the user 1 may confirm a guided content and utter "Start washing" without modifying a suggested course or option, in response to that, the speech guidance unit 120 (not shown) of the washing machine 100 may notify the user of "Ok. Washing machine will start with this cycle" (S335). Then, the washing machine may start an operation (S336).

After step S336, it is possible to proceed with the steps described in FIG. 15.

As described in FIGS. 13 to 19, the communication unit 130 of the washing machine 100 may receive the message that indicates the output of the guide message that requires the utterance of the Stain Word or the Cloth Word from the central control server 700 or the speech server 500. The speech guidance unit 120 may output the received message. For example, when the inputted word is the Stain Word, it may output the guide message that requires the utterance of the Cloth Word (S301 in FIG. 13). On the contrary, when the inputted word is the Cloth Word, it is possible to output the guide message that requests the utterance of the Stain Word (S322 in FIG. 16 or S322 in FIG. 18).

Then, the speech input unit 110 may receive the speech including the Stain Word or the Cloth Word that requires the utterance, and generates speech data. The communication unit 130 may transmit the speech data to the central control server 700 or the speech server 500 and receive the course configuring information from the central control server 700.

In order to perform the operations of FIGS. 13 to 19 for the washing machine 10, the equipment control unit 710 of the central control server 700 may analyze the word that is inputted so far and produce the message that indicates the output of the guide message that requests the utterance of the Stain Word or the Cloth Word, so that the communication unit 730 of the central control server 700 may transmit the message to the washing machine 100 or the speech server 500. Then, when the user inputs the specific word again by speech, the communication unit 730 of the central control unit 700 may receive the keyword corresponding to any one of the Stain Word or the Cloth Word that is requested previously from the washing machine 100 or the speech server 500 to produce the course configuring information.

By this invention being applied, when the user provides information such as the kind of laundry contaminant, the kind of cloth, the degree of contamination, etc., through the interactive speech recognition method, it is possible to configure a customized optimum washing course for the user by the laundry course conversion process. Further, the input order of the kind of contaminant, the degree of contamination, and the kind of cloth (laundry) can be variously selected, and the washing machine can request the utterance of the Stain Word or the Cloth Word in response to the inputted words.

In addition to that, it is possible to recommend and configure a laundry course in a washing method that the user wants, by adding an option (the rinsing, and the dehydration drying, etc.) to the laundry course, and it is possible to provide the guided details with regard to the recommendation configuration through the speech guidance unit 120 and confirm an intention of a customer.

If the course configuring information generated in response to the combination of the specifically inputted Stain Word/Cloth Word is modified by the user, the central control server 700 can store the combination of the Stain Word/Cloth Word and the modified course configuring information together with the identification information of the corresponding washing machine 100 separately or the control unit 250 of the washing machine 200 can store them. In this case, the course configuration can be made in a user-customized manner.

A recommendation configuring process (a process of searching for course configuring information) may be performed by a laundry course conversion process in the central control server 700. A mapping conversion related to the speech utterance and laundry course configuration is stored in a database, and continuously added, thereby providing new washing method.

Therefore, even if the washing machine 100 is not individually updated, when the course configuration is changed or updated in the central control server 700, the course configuration in the washing machine 100 is also changed or the combination of the option can be modified in response to that.

By this invention being applied, there are many functions expected in the washing machine. When the user does not know which laundry course has to be used for washing, it is possible to easily do the washing in a customized optimum laundry course which is determined based on the information on laundry or stain provided in the user-interactive manner. Further, since the speech data of the user is analyzed by two kinds of terms, i.e., the Cloth Word and the Stain Word, and the course configuring information specialized for the washing machine (or applicable to a general-purpose washing machine) is searched based on the results of the analysis so as to use all functions that the washing machine has, the user can utilize all functions of the washing machine optimally recommended for the present laundry.

Although all components are described by being included in the embodiment of this application are combined to one, or by being combined to be operated as one component, this application is not necessarily limited to this embodiment, and all components can be selectively combined to one or more and operated within the purpose range of this application. Further, although all of the components may be implemented as an independent apparatus, a part or all of the components may be selectively combined to form a plurality of apparatuses and a part of the components may be implemented as a computer program that has a program module to perform corresponding functions, which are functionally combined with said one or plurality of apparatuses. The codes and the code segments that are included in the computer program may be easily deduced by those skilled in the art of this application. The computer program may be stored in a computer readable medium that a computer can read, and the computer program may be read and implemented by the computer so as to implement the invention. The storage medium of the computer program may include a storage medium including a semiconductor recording element, an optical recording medium, a magnetic recording medium. Further, the computer program that implements the invention may include a program module that is transmitted in real time through an external device.

| Description of Symbols | |
| --- | --- |
| 100, 200: Washing machine | 110: Speech input unit |
| 120: Speech guidance unit | 150: Central control unit |
| 500: Speech server | 700: Central control server |

What is claimed is:

1. A washing machine, comprising:
a speech input unit configured to receive speech including any one or more of a Stain Word or a Cloth Word from a user and convert the received speech into speech data, wherein the Stain Word is a word indicating a name of stain, a color of stain, or a chemical property of stain, and the Cloth Word is a word indicating a kind of laundry, a fabric name of laundry, or a color of laundry;
a communication unit configured to transmit identification information of the washing machine and the speech data to a first server, and receive at least one of laundry course configuring information specialized for the washing machine or standard laundry course configuring information corresponding to any one or more of the Stain Word or the Cloth Word from any one of the first server or a second server that is distinguished with the first server;
a speech guidance unit configured to output a speech guide message that notifies at least one of the laundry course configuring information or the standard laundry course configuring information; and
a control unit configured to control the speech input unit, the communication unit, and the speech guidance unit,
wherein the first server or the second server is configured to (i) select a temperature corresponding to the Stain Word, analyze the Cloth Word, and reconfigure the selected temperature based on the analyzed Cloth Word or (ii) select a course corresponding to the Cloth Word, analyze the Stain word, and reconfigure the selected course based on the analyzed Stain word,
wherein the laundry course configuring information comprises a washing strength or a laundry contaminant level based on (i) the reconfigured temperature or (ii) the reconfigured course,
wherein the laundry course configuring information specialized for the washing machine is searched in a first database by using the identification information of the washing machine and at least one or more of the Stain Word and the Cloth Word, and
wherein the standard laundry course configuring information is searched, based on the laundry course configuring information not being mapped in the first database, in a second database by using at least one or more of the Stain Word and the Cloth Word.

2. The washing machine of claim 1,
wherein the standard laundry course configuring information comprises a laundry course and an option that are suitable for at least one of the Stain Word or the Cloth Word, and
wherein the standard laundry courses configuring information also comprises:
any one or more of a washing strength of washing operation, a temperature of water, a kind of detergent, an amount of the detergent, or a contaminant removal strength of laundry.

3. The washing machine of claim 1,
wherein the standard laundry course configuring information comprises a recommended laundry course that is configured based on the information associated with the Cloth Word or the Stain Word,
wherein the speech guidance unit is configured to output the speech guide message after the standard laundry course configuring information is received, and
wherein the control unit is configured to start an operation of the washing machine without a modification of the recommended laundry course or an option for the recommended laundry course according to an instruction from the user.

4. The washing machine of claim 1,
wherein the communication unit is configured to transmit the speech data to the first server, after the communication unit receives a guide message of requesting an utterance of the Stain Word or the Cloth Word from the first server or the second server, and after the speech guidance unit outputs the received message.

5. The washing machine of claim 1, wherein the laundry course configuring information is classified based on the identification information of the washing machine.

6. The washing machine of claim 1, wherein the laundry course configuring information is not mapped in the first database based on the identification information of the washing machine and the at least one or more of the Stain Word and the Cloth Word corresponding to first and second keywords that are absent from the first database.

7. A central control server, comprising:
an equipment control unit configured to search course configuring information applicable to a washing machine from a database by using a first keyword corresponding to a Stain Word, a second keyword corresponding to a Cloth Word, and identification information of the washing machine, wherein the Stain Word is a word indicating a name of stain, a color of stain, or a chemical property of stain, and the Cloth Word is a word indicating a kind of laundry, a fabric name of laundry, or a color of laundry; and
a communication unit configured to transmit the searched course configuring information to the washing machine,
wherein the equipment control unit is configured to (i) select a temperature corresponding to the Stain Word, analyze the Cloth Word, and reconfigure the selected temperature based on the analyzed Cloth Word or (ii) select a course corresponding to the Cloth Word, analyze the Stain word, and reconfigure the selected course based on the analyzed Stain word,
wherein the searched course configuring information comprises a washing strength or a laundry contaminant level based on (i) the reconfigured temperature or (ii) the reconfigured course,
wherein the equipment control unit is configured to search laundry course configuring information specialized for the washing machine in a first database by using the identification information of the washing machine and at least one or more of the Stain Word and the Cloth Word, and
wherein the equipment control unit is configured to, based on laundry course configuring information not being mapped in the first database, search standard laundry course configuring information in a second database by using at least one or more of the Stain Word and the Cloth Word.

8. The central control server of claim 7, wherein the equipment control unit is configured to extract the first keyword and the second keyword from text data that the washing machine or a speech server transmits.

9. The central control server of claim 7, wherein the searched course configuring information comprises any one or more of the washing strength of the washing machine, a temperature of water, a kind of detergent, an amount of the detergent, or a contaminant removal strength of the laundry.

10. The central control server of claim 7,
wherein the equipment control unit is configured to generate the guide message of requesting an utterance of the Stain Word or the Cloth Word, and
wherein the communication unit is configured to transmit the generated message to the washing machine or a speech server and receive a keyword corresponding to any one of the requested StainWord or ClothWord from the washing machine or the speech server.

11. The central control server of claim 7, wherein the laundry course configuring information is classified based on the identification information of the washing machine.

12. The central control server of claim 7, wherein the laundry course configuring information is not mapped in the first database based on the identification information of the washing machine and the at least one or more of the Stain Word and the Cloth Word corresponding to first and second keywords that are absent from the first database.

13. A method for configuring a laundry course based on speech recognition, comprising:
receiving, by a washing machine, speech including any one or more of a Stain Word and a Cloth Word from a user, wherein the Stain Word is a word indicating a name of stain, a color of stain, or a chemical property of stain, and the Cloth Word is a word indicating a kind of laundry, a fabric name of laundry, or a color of laundry;
converting the received speech into speech data;
transmitting the speech data and identification information of the washing machine to a first server;
receiving at least one of laundry course configuring information specialized for the washing machine or standard laundry course configuring information corresponding to the Stain Word and the Cloth Word from any one of the first server or a second server that is distinguished with the first server; and
outputting a speech guide message that notifies at least one of the laundry course configuring information or the standard laundry course configuring information,
wherein the first server or the second server is configured to (i) select a temperature corresponding to the Stain Word, analyze the Cloth Word, and reconfigure the selected temperature based on the analyzed Cloth Word or (ii) select a course corresponding to the Cloth Word, analyze the Stain word, and reconfigure the selected course based on the analyzed Stain word,
wherein the laundry course configuring information comprises a washing strength or a laundry contaminant level based on (i) the reconfigured temperature or (ii) the reconfigured course,
wherein the laundry course configuring information specialized for the washing machine is searched in a first database by using the identification information of the washing machine and at least one or more of the Stain Word and the Cloth Word, and
wherein the standard laundry course configuring information is searched, based on the laundry course configuring information not being mapped in the first database, in a second database by using at least one or more of the Stain Word and the Cloth Word.

14. The method of claim 13,
wherein the standard laundry course configuring information comprises a laundry course and at least one option for the laundry course related to the Stain Word or the Cloth Word, and
wherein the standard laundry course configuring information comprises any one or more of a washing strength of washing operation, a temperature of water, a kind of detergent, an amount of detergent, or a contaminant removal strength of laundry.

15. The method of claim 13,
wherein the standard laundry course configuring information comprises a recommended laundry course that is determined based on information associated with at least one of the Cloth Word or the Stain Word,
wherein the speech guide message is output after receiving the standard laundry course configuring information; and
wherein the method further comprises starting an operation of the washing machine without a modification of the recommended laundry course or an option for the recommended laundry course according to an instruction from the user.

16. The method of claim 13, further comprising:
after the transmitting step,
receiving a message that indicates an output of the guide message that requests an additional utterance of a Stain Word or Cloth Word, from the first server or the second server;
outputting the received message via a speech guidance unit, and receiving an additional speech including the Stain Word or Cloth Word to convert the received speech into the speech data; and
transmitting the speech data to the first server or the second server.

17. The method of claim 13,
wherein the first server is a speech server,
wherein the second server is a central control server, and
wherein the step of receiving the at least one of the laundry course configuring information or the standard laundry course configuring information comprises receiving the course configuring information from the central control server.

18. A method of claim 13,
wherein receiving at least one of the laundry course configuring information or the standard laundry course configuring information comprises:
searching, by a central server, the standard laundry course configuring information applicable to the washing machine in a database by using a first keyword corresponding to a Stain Word, a second keyword corresponding to a Cloth Word, and identification information of the washing machine, and
transmitting, by the central server, the standard laundry course configuring information to the washing machine.

19. The method of claim 13, wherein the laundry course configuring information is classified based on the identification information of the washing machine.

20. The method of claim 13, wherein the laundry course configuring information is not mapped in the first database based on the identification information of the washing machine and the at least one or more of the Stain Word and the Cloth Word corresponding to first and second keywords that are absent from the first database.

* * * * *